United States Patent [19]

Sakamoto et al.

[11] Patent Number: 5,404,422

[45] Date of Patent: Apr. 4, 1995

[54] SPEECH RECOGNITION SYSTEM WITH NEURAL NETWORK

[75] Inventors: Kenji Sakamoto, Nara; Kouichi Yamaguchi; Toshio Akabane, both of Tenri; Yoshiji Fujimoto, Nara, all of Japan

[73] Assignee: Sharp Kabushiki Kaisha, Osaka, Japan

[21] Appl. No.: 24,853

[22] Filed: Feb. 26, 1993

Related U.S. Application Data

[63] Continuation of Ser. No. 635,851, Dec. 28, 1990, abandoned.

[30] Foreign Application Priority Data

Dec. 28, 1989 [JP] Japan .................................. 1-344045
Mar. 19, 1990 [JP] Japan .................................. 2-69248
Jun. 27, 1990 [JP] Japan .................................. 2-169062
Aug. 7, 1990 [JP] Japan .................................. 2-208749

[51] Int. Cl.⁶ .................................................. G10L 9/00
[52] U.S. Cl. .................................................. 395/2.41
[58] Field of Search .................. 395/2.41, 2.11, 2.4, 395/2.57, 2.62, 2.6, 2.5, 2.41, 2.11; 381/43

[56] References Cited

U.S. PATENT DOCUMENTS 3,310,783  3/1967  Putzrath .
4,805,225  2/1989  Clark .................................. 382/15
4,941,122  7/1990  Werdeman ............................ 395/11
4,975,961 12/1990  Sakoe .................................. 381/43

OTHER PUBLICATIONS

Sakoe et al. "Speaker-Independent Word Recognition Using Dynamic Programming Neural Networks", IEEE, ICASSP, 1989, pp. 29–32.
Waibel et al., "Phoneme Recognition Using Time-Delay Neural Networks", 8084 IEEE Trans. on Acoustics, Speech etc. 37 (1989) Mar. No. 3 pp. 1–3.
Kammerer et al., "Experiments for Isolated-Word Recognition with Single- and Two-layer Perceptions", Neural Networks vol. 3, pp. 693–706 1990.
Lubensky, "Learning Spectral-Temporal Dependencies Using Connectionist Networks", IEEE, 1988, pp. 1–4.
Hirai et al., "Phoneme-based Word Recognition by Neural Network A Step Toward Large Vocabulary Recognition", IJCNN International.
Joint Conference on Neural Networks, Catalog No. 90Ch2879-5 Jun. 17–21, 1990, pp. 5–7.
Waibel, Alex. "Phoneme Recognition Using Time-Delay Neural Networks" *IEICE Technical Report*, SP87-100, 1987-12, pp. 19–24.

(List continued on next page.)

Primary Examiner—Allen R. MacDonald
Assistant Examiner—Michelle Doerrler
Attorney, Agent, or Firm—David G. Conlin; George W. Neuner; Milton Oliver

[57] ABSTRACT

A voice recognition apparatus capable of recognizing any word utterance by using a neural network, the apparatus includes a unit for inputting an input utterance and for outputting compressed feature variables of the input utterance a unit using a neural network and connected to the input unit for receiving the compressed feature variables output from the input unit and for outputting a value corresponding to a similarity between the input utterance and words to be recognized. The neural network unit has a first unit for outputting a value which corresponds to a similarity in partial phoneme series of a specific word among vocabularies to be recognized with respect to the input utterance. The neural network also has a second unit connected to the first unit for receiving all of the values output from the first unit and for outputting a value corresponding to a similarity in the specific word with respect to the input utterance. And the neural network also has a third unit connected to the second unit for receiving all of the values output from the second unit and for outputting a value corresponding to a classification of voice recognition in which the input utterance belongs.

14 Claims, 23 Drawing Sheets

OTHER PUBLICATIONS

Sakoe, Hiroaki et al. "Speaker-Independent Word Recognition Using Dynamic Programming Neural Networks" *IEEE, ICASSP '89,* 1989,S1.8.

Mori, Yoshihiro, "Aiming At A Large Scale Neural Network" *IEICE Technical Report,* PRU 88-59, 1987, pp. 87-94.

Waibel et al., "Phoneme Recognition using Time-Delay Neural Networks", 8084 IEEE Trans. on Acoustics, Speech etc. 37 (1989) Mar. No. 3, pp. 328-339.

Kammerer et al., "Experiments for Isolated-Word Recognition with Single- and Two-layer Perceptions", Neural Networks vol. 3, pp. 393-706, 1990.

Lubensky, "Learning Spectral-Temporal Dependencies Using Connectionist Networks", IEEE, 1988, pp. 418-421.

Hirai et al., "Phoneme-based Word Recognition by Neural network A Step Toward Large Vocabulary Recognition", IJNN International Joint Conference on Neural Networks, Catalog No. 90Ch2879-5 Jun. 17-21, 1990, pp. 671-676.

Waibel, Alex, "Phoneme Recognition Using Time-Delay Neural Networks" *IEICE Technical Report,* SP87-100, 1987-12, pp. 19-24.

Sakoe, Hiroaki et al., "Speaker-Independent Word Recognition Using Dynamic Programming Neural Networks" *IEEE, ICASSP '89,* 1989, S1.8, pp. 29-32.

Mori, Yoshihiro, "Aiming At A Large Scale Neural Network" *IEICE Technical Report,* PRU 88-59, 1987, pp. 87-94.

SPEECH RECOGNITION SYSTEM WITH NEURAL NETWORK

This is a continuation of copending application(s) Ser. No. 07/635,851, filed on Dec. 28, 1990, now abandoned.

BACKGROUND OF THE INVENTION

1. Field of the Invention

The present invention relates to a voice recognition apparatus which employs a neural network and is capable of recognizing any word voiced by unspecified persons. More particularly, the invention relates to the voice recognition apparatus which provides more highly efficient nonlinear matching along time axis.

2. Description of the Related Arts

Today, a neural network, which is a modelling system of neurons in a human brain, has been applied to a voice recognition field. The inventors of the present application know that various approaches using the neural network have been attempted such as a multi-layer perceptron type neural network using an error back propagation method (BP method, for short), which is described in Nakagawa: "Voice Information Processing" Bit magazine, September 1989 issue, pp. 183–195, Vol. 21, No. 11, and Shikano: "Application of Neural Network to Voice Information Processing" in the Proceedings of the Communications Society, pp. 27–40, September, 1988.

Voice recognition apparatuses are generally categorized into two types of systems. For one system, an input voice is analyzed at each frame so that feature or characteristic vectors (feature or characteristic parameters) are extracted for each frame. The extracted feature vectors are applied as two-dimensional patterns arranged in time series into an input layer of a neural network. Meanwhile, a teacher signal for identifying the input voice is applied to an output layer of the neural network, thereby allowing a weight coefficient of each link to be obtained using the BP method. Then, by making use of the fact that an actually-voiced word has a slightly different length each time, even if the same word is voiced by the same person while since the number of units included in the input layer of the neural network is constant, the input voice data series are normalized to a predetermined length and the feature vectors of an unknown input voice are applied to the neural network which has learned the weight coefficient of each link based on the feature vectors. Then, the input voice is allowed to be recognized, depending on an output value of each unit included in the output of the neural network.

For the other system, referred to as a multi-template system, each word voice data given by many, unspecified speakers are broken into segments. Then, the voice data, based on the center of each segment or an average value of the voice data belonging to each cluster, are stored as a reference pattern. For segmenting the word voice data, several algorithms are used in combination. Then, for an unknown input voice, the distances between the feature pattern of the input voice and the reference patterns of the stored words are all calculated with a DP (Dynamic Programming) matching method so that the voiced word is recognized as a word matched to a reference pattern with the minimum distance.

The foregoing systems both require detection of a head and a tail of the input voiced word. The detection of a voice interval defined by the word head and tail depends on whether or not a short-period power larger than a predetermined threshold value continues for a constant time or more. Two threshold values are prepared for the short-period power. The voice interval can be detected by using these two threshold values in combination. Or, it may be detected by using a zero crossing or a difference between a noise interval and the voice interval itself.

The voiced word is, however, a time-series pattern, so that an actually-voiced word has each duration even if the same word is voiced and provides nonlinear fluctuation of phonemes with respect to the time. Further, it is desirable to prevent false recognition due to a cough or paper noise. For distinguishing unnecessary sound from the voice, however, a word-spotting method is required for automatically extracting only predetermined words out of the voice reading a manuscript.

One of the foregoing methods, that is, the multi-template system using the DP matching method, requires detection of a voice interval before recognition-processing the voice. However, it is not easy to properly detect the voice interval and quite difficult to detect a head of a word voice, a tail consonant and a low vowel. Further, it is necessary to properly remove noises such as a respiratory sound added to the voice tail. The aforementioned methods dependent on the short-period power, zero crossings or difference between the voice interval and the noise interval do not meet those requirements. It results in erroneously detecting the voice interval and lowering a recognition rate.

If the word-spotting method is used, it may bring about another shortcoming that the continuous DP matching requires a lot of calculations and causes an extra word to be added and an actual word phoneme to be deleted.

The foregoing method using the neural network requires the input voice interval to be normalized, because the input layer included in the neural network includes a predetermined number of units. If the input voice interval is linearly normalized, however, it results in very often transforming or shifting the time of occurrence of the dynamic feature characteristic of the necessary phoneme for identifying the voiced word, thereby disallowing the longer or shorter nonlinear word voice pattern to be corrected.

Further, the normal voice recognition apparatus has to remove a voiceless interval and a noise interval before and after the speech, from the signal input by the microphone for extracting a voice interval, that is, detecting the voice interval.

The detection of the voice interval is not so difficult if the signal has a high S/N ratio. In this state, the voice interval may be defined as a interval where the power series extracted from a voice signal are larger than a threshold value.

In actual environments, however, there exist various noises so that the S/N ratio may be degraded. Hence, it is difficult to detect a weak frictional sound and a voiced sound with a small amplitude often provided on a head and a tail of voice. Moreover, an unsteady noise may be erroneously detected as a voice interval.

For distinguishing a voice interval from the background noises, there has been proposed a method for selecting a proper voice interval from a plurality of interval candidates.

This method mainly takes the two steps of voice-recognizing each interval candidate and selecting as a proper voice interval the interval at which the highest checking value can be obtained.

As an improvement of the above method, a method has been proposed for setting all the times on the data as front endpoint and tail candidates, voice-recognizing all the intervals, and finding the interval at which the highest checking value can be obtained. One example of this method is the word spotting using a continuous DP method as mentioned above.

The voice recognition apparatus employing the word spotting method with the continuous DP method has an disadvantage that it can offer a low "reject" capability and noise-resistance. Moreover, it may add an unnecessary word or drop a word or phoneme and requires a great amount of computations and storage, because the DP matching has to be always done.

And, the foregoing voice recognition apparatus has to detect the front endpoint in advance and may erroneously recognize or reject the subject word if the detection error is large.

SUMMARY OF THE INVENTION

It is an object of the invention to provide a voice recognition apparatus using a neural network which is capable of obtaining stable weight coefficients and compensating for local time slippage of each phoneme of the input utterance fluctuating nonlinearly from the reference word pattern.

It is another object of the invention to provide a voice recognition apparatus using a neural network which is capable of recognizing an input utterance having background noise.

It is a third object of the invention to provide a voice recognition apparatus using a neural network which can greatly reduce the amount of computation.

An object of the present invention can be achieved by a voice recognition apparatus capable of recognizing any word utterance by using a neural network, the apparatus including a unit for inputting a input utterance and for outputting compressed feature variables of the input utterance, a unit using a neural network and connected to the input unit for receiving the compressed feature variables output from the input unit and for outputting a value corresponding to a similarity between the input utterance and words to be recognized, the neural network unit having a first unit for outputting a value which corresponds to a similarity in partial phoneme series of a specific word among vocabularies to be recognized with respect to the input utterance, a second unit connected to the first unit for receiving all of the values output from the first unit and for outputting a value corresponding to a similarity in the specific word with respect to the input utterance, and a third unit connected to the second unit for receiving all of the values output from the second unit and for outputting a value corresponding to a classification of voice recognition in which the input utterance belongs.

Preferably, the first unit is capable of sound analyzing the input utterance, whereby feature values are generated and shifted in a time scale and an input frame is selected so as to maximize each of the output values output from the first unit corresponding to the similarity among the shifted feature values.

Further preferably, the first unit includes a plurality of event nets for selecting each of the input frames so that each of the event nets is enabled to supply a maximum value as the feature variables being shifted along a time axis.

More preferably, the second unit includes one word net or a plurality of word nets, each of the word nets being connected to a corresponding event net of the plurality of event nets for receiving the values output from the plurality of event nets and for outputting a value corresponding to the similarity in the specific word with respect to the input utterance.

Furthermore preferably, the third unit is a super net connected to the word net or the plurality of word nets for receiving all the values output from the word net or the plurality of word nets and for outputting the value corresponding to the classification of voice recognition in which the input utterance belongs.

Each of the first, second and third unit includes an input layer for receiving the values output from the plurality of event nets, a middle layer connected to each of the event nets respectively for receiving a first signal output from the input layer and for outputting a second signal produced by converting a sum of the first signal of the input layer using a sigmoid function, and an output layer for outputting the value corresponding to the similarity in the specific word with respect to the input utterance, preferably.

A number of the neural network is preferably equal to a number of the vocabulary to be recognized.

The input unit preferably includes a unit for receiving the input utterance, a unit connected to the receiving unit for amplifying the input utterance, a unit connected to the amplifying unit for converting the amplified input utterance into an electrical signal, a unit connected to the converting unit for extracting the feature variables from the electrical signal, and a unit connected to the extracting unit for compressing the feature variables.

Preferably, the apparatus further includes a voice interval cutting section connected to the compression section for defining a voice interval.

More preferably, the apparatus further includes a feature variable storing section connected to the compression section for storing the compressed feature variables, event net output storing sections connected to the plurality of the event net groups respectively for storing outputs of the event net groups, and word net output storing sections connected to the word nets respectively for storing the outputs of the word nets.

Furthermore preferably, the apparatus further includes a unit for providing one or more threshold values to determine that the maximum value sent from the third unit is rejected.

Preferably, the first unit includes a plurality of event nets for receiving feature variables extracted from an input utterance, each of the event nets being arranged to shift the feature variable within a predetermined range from a front endpoint positioned at any time in accordance with a time interval information obtained by analyzing speech samples of a plurality of unspecified persons and by selecting a location at which a maximum output is made possible among the shifted locations of the feature variables so that a value corresponding to a similarity between the partial phoneme series of the corresponding word to be recognized and the input utterance is output.

Further preferably, the apparatus uses a Dynamic Programming (DP) method for checking the similarity, and a number of the neural network is equal to a number of the vocabulary to be recognized.

More preferably, the unit for receiving the input utterance is a microphone.

The unit connected to the receiving unit for amplifying the input utterance is preferably an amplifier.

The unit connected to the amplifying unit for converting the amplified input utterance into an electrical signal is preferably an analog to digital converter, with the electrical signal being a digital signal.

The unit connected to the converting unit for extracting the feature variables from the electrical signal is a bandpass filter groups, each of the groups being composed of a plurality of low pass filter, preferably.

The unit connected to the extracting unit for compressing the feature variables is a compression devices, preferably.

In operation, the voice recognition apparatus according to the first aspect of the invention works as follows. The event nets serve to output a value matching to similarity between the input utterance and the partial phonemes series of the specific word in the recognition vocabulary. Then, the word net serves to receive all the output signals sent from the event nets and output a value matching to similarity between the input utterance and the specific word. Finally, the super net serves to receive all the output signals sent from the word net and output a value matching to the recognition field of the input utterance. Hence, the voice recognition apparatus can take the steps of moving on time axis the feature variables obtained by frequency-analyzing the input utterance at each frame, and selecting the input frame so that each output value of the event nets matching to the similarity is maximized, resulting in allowing the input utterance to be recognized.

Another object of the present invention can be achieved by a voice recognition apparatus capable of recognizing any word utterance by using a neural network, the apparatus including a unit for detecting a front endpoint of an input word utterance on the basis of feature variables which are extracted from the input utterance, the feature variables being shifted any time in sequence from the detected front endpoint of the input utterance in accordance with a time interval information extracted from a plurality of speech samples of unspecified persons, a plurality of event nets for receiving an input utterance at each input layer and for outputting a value corresponding to a similarity between partial phoneme series of a corresponding word included in a vocabulary to be recognized at each output layer, and the input utterance being frequency analyzed at each frame to extract the feature variables of the input utterance, the plurality of even nets serving to select each input frame so that each of the event nets is enabled to supply a maximum value as the feature variables being shifted along a time axis, one or more word nets connected to the corresponding plurality of event nets for receiving all the inputs of the corresponding plurality of event nets and for outputting a value corresponding to a similarity between the input utterance and the corresponding word, a number of the neural network consisting of one word net and a plurality of event nets being equal to a number of the vocabulary to be recognized, and a super net connected to the one or more word nets for receiving all the inputs of the one or more word nets and for outputting a value corresponding to the word to be recognized which corresponds to the input utterance, with each net consisting of a multilayer perceptron neural network and having at least an input layer, a middle layer and an output layer.

The voice recognition apparatus according to the second aspect of the invention works as follows. The detecting unit serves to detect the front endpoint of the input utterance based on the feature variables obtained by frequency-analyzing the input utterance at each frame and apply the detecting result to the event net. The event net serves to shift the feature variables within a predetermined time range based on the time interval information obtained from the speech samples of many speakers and output a value representing to similarity between the input utterance and the partial phoneme series of the specific word in the vocabulary when the feature variables being moved on time axis become maximum. Then, the word net receives the output signals from the event net and outputs a value representing to similarity between the input utterance and the specific word. Finally, the super net serves to receive all the output signals sent from the word net and to output a value representing to the recognition field of the input utterance.

The third object of the present invention can be achieved by a voice recognition apparatus capable of recognizing any word utterance by using a neural network, the apparatus includes a plurality of event nets for receiving an input utterance, one or more word nets for performing an initial learning by computing connection coefficients between the adjacent layers in accordance with an input data corresponding to a specific conditions and teacher data, the connection coefficients being used for identifying a specific word, and for performing a main learning by computing the connecting coefficients in accordance with the input utterance sent from the event net with the connecting coefficients computed in the initial learning to be set as initial values, a super net for performing an initial learning by computing connecting coefficients between adjacent layers, in accordance with an input utterance corresponding to a specific condition and teacher data, the connection coefficient being used for identifying a category of the input utterance sent from the word, and for performing a main learning by computing the connecting coefficients in accordance with the input utterance sent from the word net with the connecting coefficients computed in the initial learning to be set as the initial values, each of the nets consisting of a multilayer perceptron neural network and having at least an input layer, a middle layer and an output layer.

The voice recognition apparatus according to the third aspect of the invention works as follows. The word net serves to initially learn the input data meeting the specific condition and the teacher data and compute the connecting coefficients between the adjacent layers of the word net for identifying a specific word from another word. With the computed connecting coefficients as an initial value, the word net further computes the connecting coefficients between the adjacent layers of the word net for an input utterance based on the output value of the event net. Then, the super net serves to initially learn the input data meeting the specific condition and the teacher data and compute the connecting coefficients between the adjacent layers of the super net for identifying the recognition category of the input utterance. With the computed connecting coefficients as an initial value, the super net further learns the output value of the word net for the actual input utterance and computes the connecting coefficients for the input utterance.

It results in allowing a specific word to be identified without sequentially computing the output values of the event net and the word net when learning, thereby making it possible to achieve a high "reject" capability for the input utterance not to be recognized and high identifying efficiency.

The event net receives the feature variables obtained by frequency-analyzing the input utterance at each frame, shifts the feature variables input to each event net along a time axis within a predetermined range, based on the time interval information between the adjacent event nets obtained by analyzing the speech samples of many, and unspecified speakers, and determines whether or not the input utterance is included in the recognition vocabulary. Then, the event net selects the specific variable providing the largest value out of the specific variables shifted along the time axis and outputs a value representing to similarity between the input utterance and the partial phoneme series of a specific word of the recognition vocabulary. The word net receives the output given by the event net and outputs a value representing to similarity between the input utterance and the specific word. Then, the super net receives the output given by the word net and outputs a value representing to the recognition word corresponding to the input utterance.

It results in more efficiently doing the word spotting and automatically extracting only the recognition vocabulary out of the continuous word utterances without erroneously functioning any other word utterance than the recognition vocabulary, thereby improving voice recognition in the context of background noises.

Further objects and advantages of the present invention will be apparent from the following description of the preferred embodiments of the invention as illustrated in the accompanying drawings.

DESCRIPTION OF THE PREFERRED EMBODIMENTS

First Embodiment

Now, a first embodiment of the invention will be discussed with reference to FIGS. 1 to 9.

Figure 1:
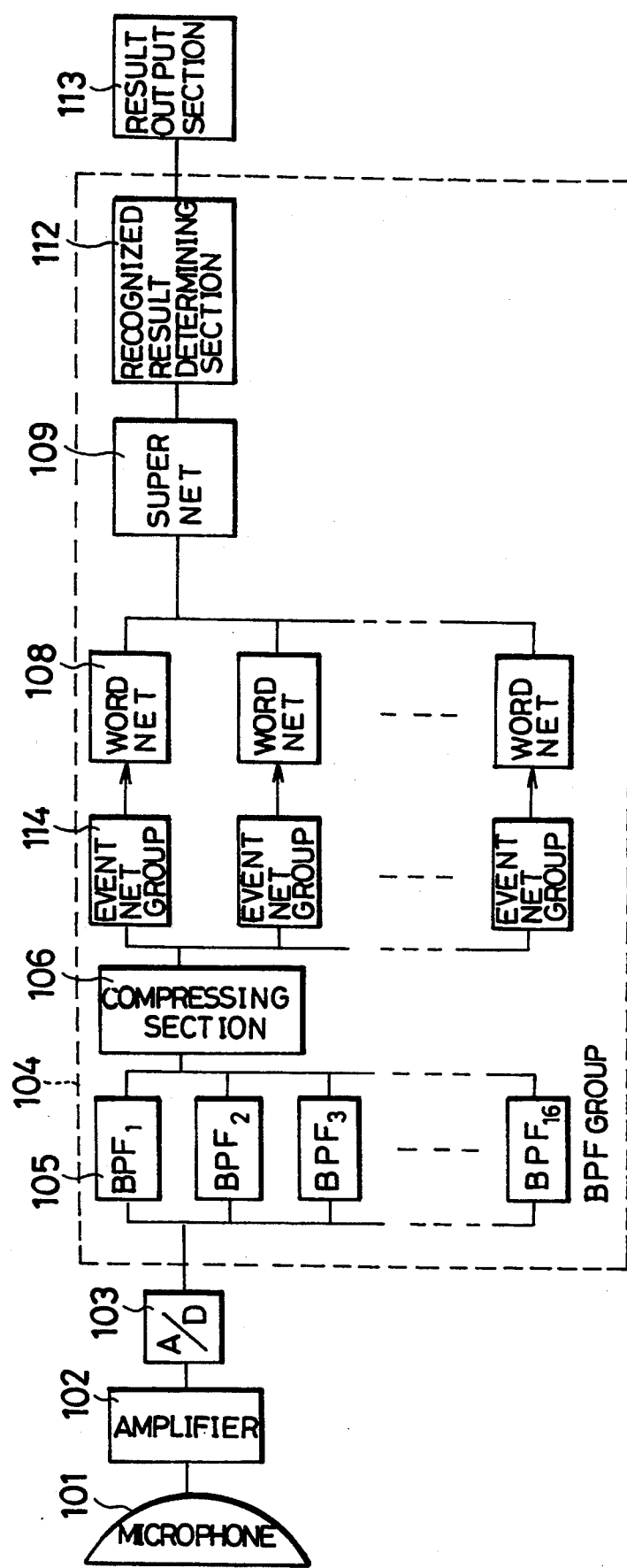
FIG. 1 is a block diagram showing a voice recognition apparatus according to a first embodiment of the invention.

FIG. 1 is a block diagram showing the voice recognition apparatus. In the apparatus, a voice is input at a microphone 101 and sent to an amplifier 102 at which it is amplified. Then, the amplified signal is converted into a digital signal in an A/D converter 103 and is applied to a frequency-analyzing section 104, in which a bandpass filter 105 serves to frequency-analyze the voice and output a power value at each frame, resulting in forming a feature vector. For reducing the network in size, the feature vectors are compressed by K-L transformation so that the dimensions of the feature vectors can be reduced.

The feature vectors of the input utterance are applied into an event net group 114 (see also FIG. 2) consisting of a plurality of event nets 107. Each event net group 114 applies an output to each word net 108. The count of the combination consisting of the event net group 114 and the word net 108 is equal to the count of word categories into which a recognition vocabulary (all the words to be recognized) is divided. Each word net 108 applies an output to a super net 109.

Figure 2:
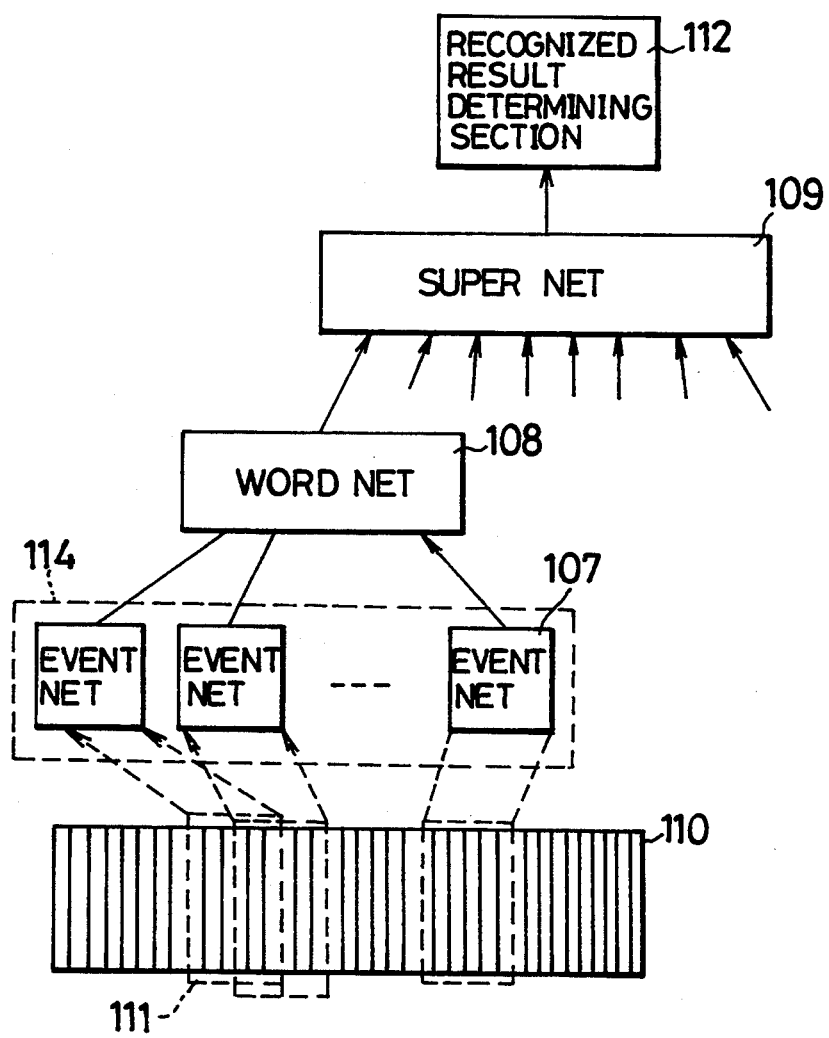
FIG. 2 is a view illustrating how the networks are arranged according to the first embodiment of the invention.

FIG. 2 shows arrangement of a voice recognition apparatus designed according to the first embodiment of the invention.

Turning to FIG. 2, the defined range of the feature vectors 110 of the input utterance is applied into an input layer of the event net 107. The defined range matches to an input frame 111 of the input layer. For inputting a specific word to the input layer, the input frame 111 is shifted 5 times on a time axis so as to prepare five input frames 111. The event net 107 serves to check similarity between the feature vectors 110 formed by the input frame 111 and the partial phoneme series of the specific word and output a value representing to the similarity to the word net 108. The word net 108 serves to check similarity between the input utterance and the specific word to be identified by the word net 108 and output a value representing to the similarity. Hence, the number of the word nets 108 is equal to that of the recognition vocabulary. Each value output by each word net 108 is applied to an input layer of the super net 109.

The super net 109 also includes an output layer which provides thirty units each representing to a category number of the recognition vocabulary and one unit representing "reject". The super net 109 serves to define a weight coefficient of each link. If the input utterance is included in the recognition vocabulary, the weight coefficient is defined so that the unit for the category number of the input utterance can output the largest value among the other units.

If, on the other hand, the input utterance is not included in the recognition vocabulary, the weight coefficient of each link is defined so that the unit for the reject can output the largest value among the other units.

The value output by the super net 109 is sent to a recognized result determining section 112. The section 112 serves to retrieve and output the category number of the unit outputting the largest value in the output layer of the super net 109. Then, the unit number is sent from the section 112 to a result output section 113 in which the recognized result is displayed.

The overall flow from the frequency-analyzing section 104 to the recognized result determining section 112 is preferably implemented using a digital signal processor.

Figure 3:
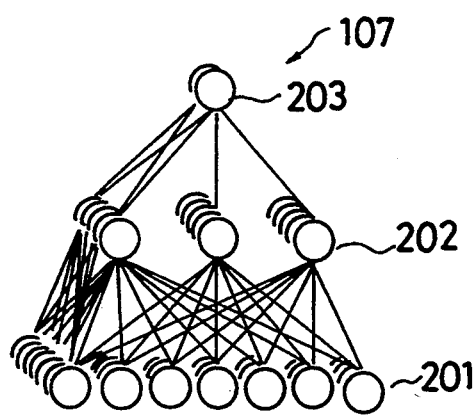
FIGS. 3 and 4 are views showing how event nets are arranged according to the first embodiment of the invention.
Figure 4:
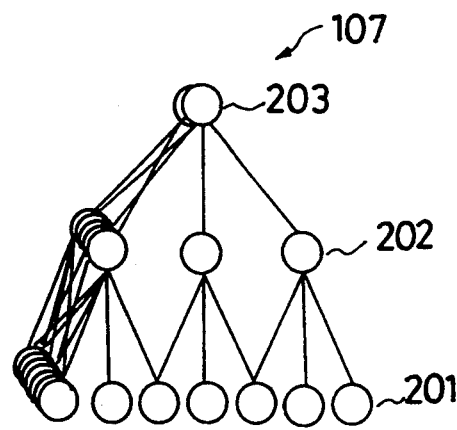

The following description sets forth how to obtain the weight coefficient of each link included in the neural network, that is, a learning method with reference to FIGS. 3 and 4.

(A) Learning Method of the Event Net

The event net 107 designed according to this embodiment consists of a three layer perceptron neural network.

FIG. 3 shows how input-layer units 201, middle-layer units 202 and an output-layer unit 203 are connected with each other. The input-layer units 201 are restricted by the feature vectors. That is, they are oriented toward the feature vectors (in FIG. 3, perpendicularly with respect to the paper). The number of them are equal to the dimensions of the feature vectors. In voice recognition, several frames of the bandpass filter are normally compressed in light of efficiency, because the adjacent frames indicate high correlation with each other. The present embodiment employs data formed by compressing two frame-powers of 16-channel bandpass filter into six dimensions by the K-L transforming operation and seven-dimension feature vectors consisting of all the frame-powers of the bandpass filter. The input-layer units 201 are thus oriented in parallel to the seven feature vectors. And, since the analyzing period is 10 ms and two frames are compressed to one frame, it results in the time difference between the adjacent input-layer units 201 (in FIG. 3, transversely with respect to the paper) being equal to 20 ms.

The middle-layer units 202 includes five units oriented in parallel to the feature vectors. Each of the middle-layer units 202 is connected to all the input-layer units 201.

Likewise, the output-layer units 203 include two units oriented in parallel to the feature vectors. Each of the output-layer units 203 is connected to all the middle-layer units 202.

To represent input-output characteristics of the middle-layer units 202 and the output-layer units 203, a sigmoid function is employed.

FIG. 4 shows the small-scaled event net 107 in which the connecting lines between the middle-layer units 202 and the input-layer units 201 are reduced in number for faster processing.

In the voice recognition, the connecting lines can be reduced, because the feature vectors separated far away from each other are not adversely effected with each other.

Next, the description will be directed to how the event net learns the input data. At first, with a spectrogram, the feature vectors of the input utterance are categorized as the labels shown in TABLE 1 in accordance with the phonemes of the input utterance. In a word included in any category of the recognition vocabulary, assume that $L_k$ denotes the k-th label of the word, $t_k(n)$ denotes a time when the border appears between the label $L_k$ and the label $L_{k+1}$, that is, a time when the label $L_k$ appears with a front endpoint set as a time 0, W(n) denotes a word length (overall time length) and Nc denotes the number of words included in the category, an average time $t_k$ when the border appears between the label $L_k$ and the label $L_{k+1}$ can be obtained by the following equation (1):

$$t_k = \left[ \frac{1}{N_c} \sum_{n=1}^{N_c} \frac{t_k(n)}{W(n)} \right] \left[ \frac{1}{N_c} \sum_{n=1}^{N_c} W(n) \right] \quad (1)$$

The label border appearing on the average border-appearing time $t_k$ is termed as label reference pattern.

Figure 5:
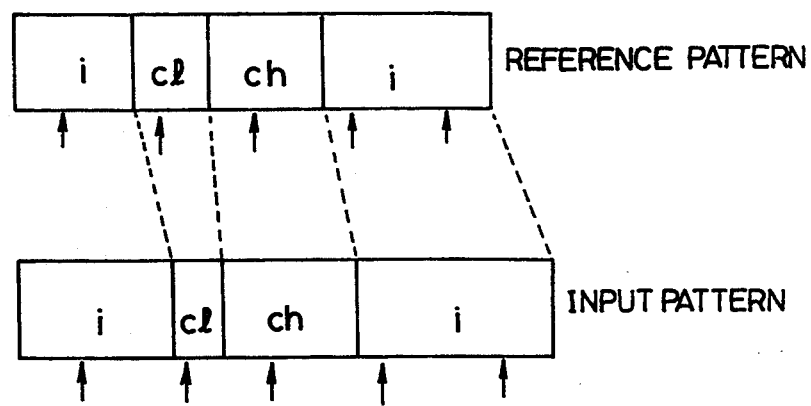
FIG. 5 shows a label and a central frame of the event net according to the first embodiment of the invention.

FIG. 5 shows the label reference pattern of a word "ichi", in which each of arrows indicates the central frames of the feature vectors 110 to be input to the event net 107 (the central frame means the fourth frame counted from the first frame since the input layer of the event net 107 has seven frames as mentioned above).

The central frame of each feature vector 110 is so defined that the central frames of the first to the fifth event nets 107 are ranged at equal intervals as shown in FIG. 2.

Turning to FIG. 5, in learning, the central frame of each event net 107 is defined at the position where input are the feature variables of the same partial phoneme series determined by comparing the reference pattern with the label pattern of the input utterance.

If the feature vector 110 of the word utterance is input to the input layer of the event net 107 at the position where each central frame is defined, it is possible to keep constantly the feature vector 110 having the constant partial phoneme series even if the fluctuation of voice results in providing the nonlinear time series of the phonemes.

Assuming that $E_{ij}$ denotes the j-th event net 107 for recognizing the i-th word category of the recognition vocabulary, the event net $E_{ij}$ has two units $c_{ij}$, $\overline{C_{ij}}$ in the output layer. When the event net $E_{ij}$ receives the partial phoneme series to be recognized therein, it supplies a teacher signal of;

$$(c_{ij}, \overline{C_{ij}}) = (1, 0) \qquad (2)$$

When the event net $E_{ij}$ receives the other phonemes, it supplies a teacher signal of;

$$(c_{ij}, \overline{C_{ij}}) = (0, 1) \qquad (3)$$

To speed up the learning process, it may be possible to change the teacher signal from 1 to 0.9 and from 0 to 0.1. And, for more easily creating the teacher signal, when the event net $E_{ij}$ receives the word to be recognized therein, it may supply a teacher signal of;

$$(d_{ij}, \overline{C_{ij}}) = (1, 0) \qquad (4)$$

When the event net $E_{ij}$ receives any other word, it may supply a teacher signal of;

$$(c_{ij}, \overline{C_{ij}}) = (0, 1) \qquad (5)$$

This is how the weight coefficient of each link is defined in the event net $E_{ij}$.

When the event net $E_{ij}$ learns any word except the word to be recognized therein, the central frame of each event net $E_{ij}$ is defined in a manner that each event net $E_{ij}$ is located at equal intervals, which is the same as the method where the central frame is defined on the reference pattern.

The resulting event net $E_{ij}$, that is, the event net $E_{ij}$ learning any other word, allows the unit $c_{ij}$ to output a maximum value and the unit $\overline{C_{ij}}$ to output a minimum value if it receives the partial phonemes of the word to be recognized therein. Conversely, the event net $E_{ij}$ allows the unit $c_{ij}$ to output a minimum value and the unit $\overline{C_{ij}}$ to output a maximum value if it receives the other phonemes of the word.

The number of the event net $E_{ij}$ is not restricted as five. It may be changed for each word to be recognized. For example, the number of the event net $E_{ij}$ may be two plus the number of syllables of the word to be recognized.

(B) Learning Method of the Word Net

In actual voice recognition, it is necessary to properly position the event net $E_{ij}$ before receiving the feature vector 110 of the input utterance. The position of the event net $E_{ij}$ is defined so that the output-layer unit $c_{ij}$ of the event net $E_{ij}$ can output a maximum value.

According to the present embodiment, when defining the central frame of the event net $E_{ij}$, the event net $E_{ij}$ is shifted along the time axis and the output values given by the output-layer units are compared three times. The number of comparison may be adjusted in light of the amount of computations.

Herein, assume that the $5 \times 3 = 15$ event nets $E_{ij}$ are arranged at equal intervals for more easily obtaining the location of each event net $E_{ij}$.

Each event net $E_{ij}$ including the shifted one is located in the same manner that the central frame of the event net $E_{ij}$ is defined on the label reference pattern.

At first, each event net $E_{ij}$ is referred to as $E_{i1-1}$, $E_{i1-2}$ $E_{i1-3}$, ..., $E_{i5-1}$, $E_{i5-2}$, and $E_{i5-3}$. The event net $E_{i1-2}$ is located in a manner that the central frame is located 20 ms later than the front endpoint of the input utterance, the event net $E_{i5-2}$ is located in a manner that the central frame is located 20 ms earlier than the tail of the word, the event nets $E_{i1-3}$ to $E_{i5-1}$ located between $E_{i1-2}$ and $E_{i5-2}$ are located at equal intervals, and the event nets $E_{i1-1}$ and $E_{i5-3}$ are located to keep the same interval as the above, resulting in allowing all the event nets $E_{ij}$ to be ranged at equal intervals.

In the event nets $E_{ij}$ ranged as above, consider one event net $E_{ij}$. The event net $E_{ij}$ is shifted to $E_{ij-1}$, $E_{ij-2}$ and $E_{ij-3}$ which respectively provide output values. Then, the maximum value of them is applied to the input-layer unit of the word net 108. This operation is done for the five event nets $E_{ij}$.

Figure 6:
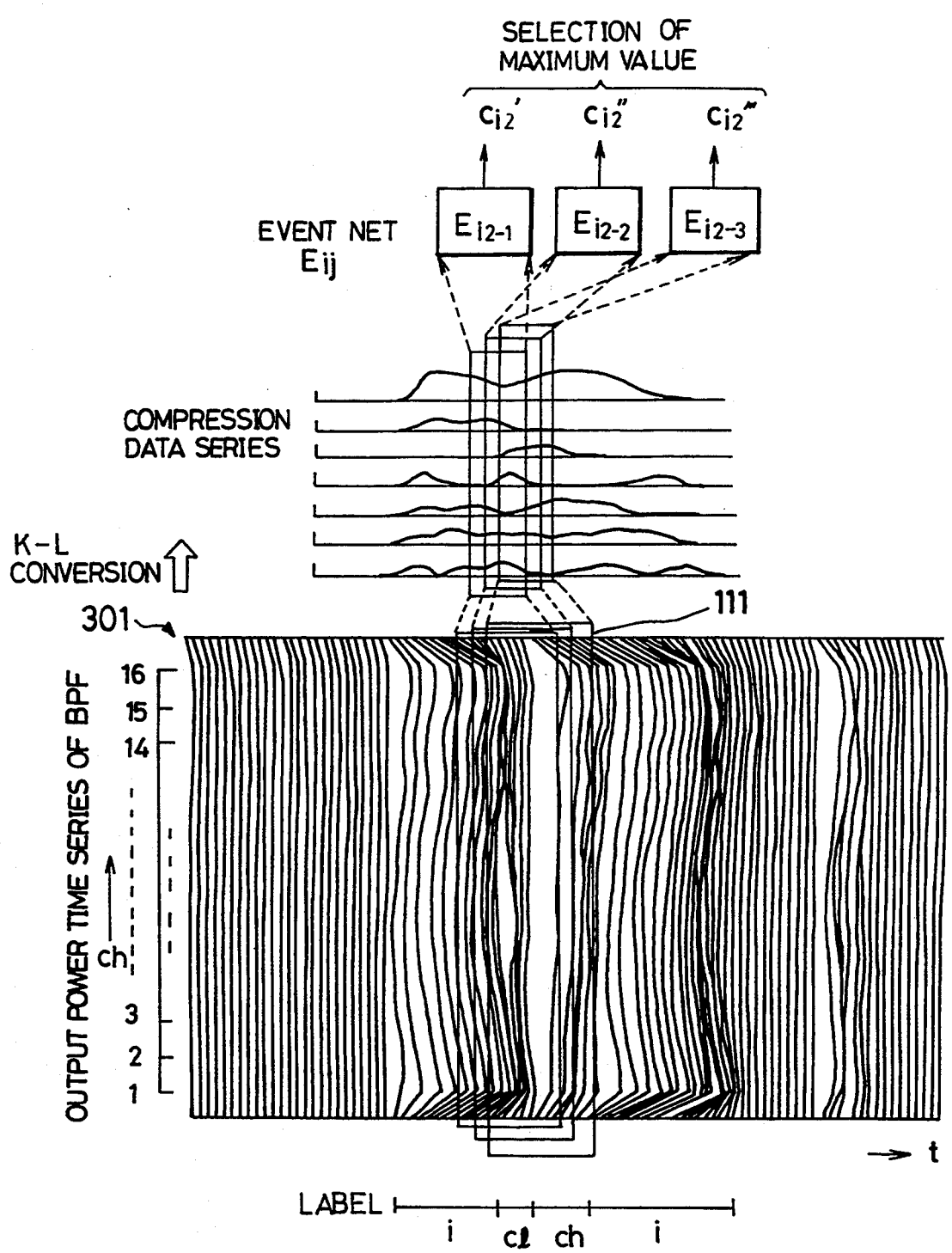
FIG. 6 is a view showing the relation between a power of a bandpass filter and an input frame of the event net according to the first embodiment of the invention.

FIG. 6 shows the relation between the time series of the power 301 provided by the 16-channel bandpass filter and the input frame 111 by which the feature vectors are formed. In the portion representing the power 301 output by the 16-channel bandpass filter (the lower half portion of FIG. 6), the vertical axis indicates a channel number of the bandpass filter and the horizontal axis indicates a time. Each curve is sketched along the output values given by the sixteen channels.

FIG. 6 shows how the event net $E_{i2}$ is shifted on time axis. As shown, the event net $E_{i2}$ is shifted to $E_{i2-1}$, $E_{i2-2}$ and $E_{i2-3}$ which respectively receive the feature vectors formed by the input frame 111 and supply the value $c_{i2}'$, $c_{i2}''$ and $c_{i2}'''$. The maximum value of these values is applied to the input-layer unit of the word net 108 as shown in FIG. 2.

Figure 7A:
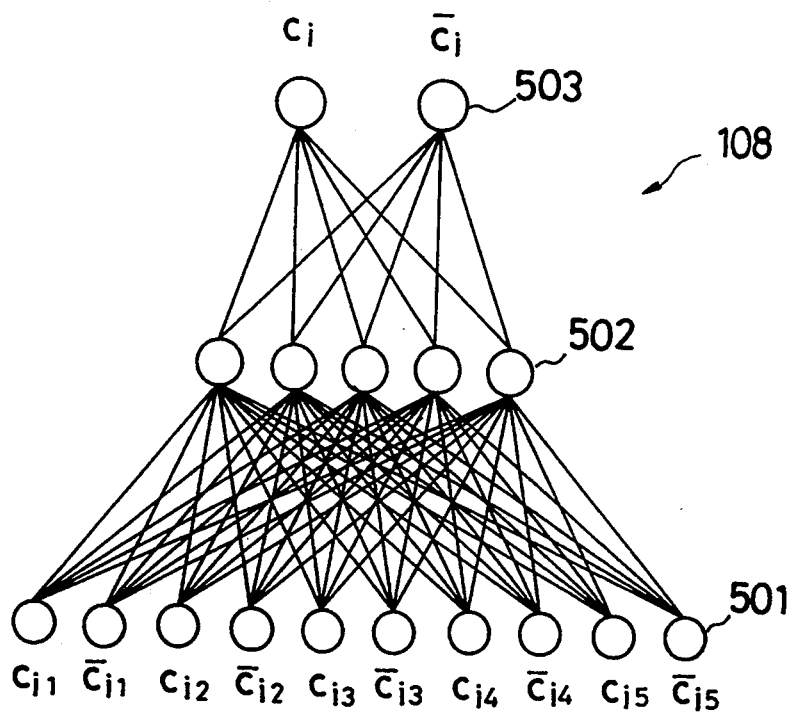
FIGS. 7A and 7B are views showing how word nets are arranged according to the first embodiment of the invention.

Turning to the word net 108, as shown in FIG. 7A, the word net 108 consists of a three layer perceptron type neural network.

The input-layer of the word net 108 includes ten units 501 each receiving the output of the output-layer unit 203 (see FIG. 3 or 4) of each event net $E_{ij}$. The middle-layer includes five units 502 and the output layer includes two units 503. The output-layer units 503 are referred to as $c_i$ and $\overline{C_{ij}}$.

Figure 7B:
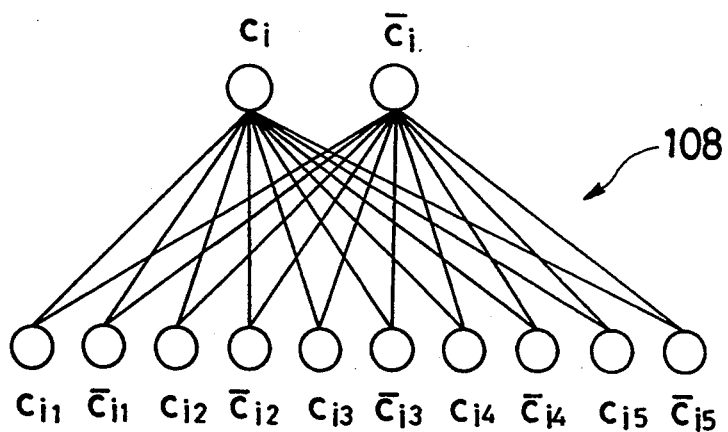

The network may be scaled down and arranged to employ the two layer perceptron type neural network as shown in FIG. 7B for speeding up the voice recognition processing. In the arrangement, when the word net 108 starts learning, it is better to set the weight coefficients of the links of $c_i$, $c_{ij}$ and $\overline{C_i}$, $\overline{C_{ij}}$ as positive and those of the links of $c_i$, $\overline{C_{ij}}$ and $\overline{C_i}$, $c_{ij}$ as negative for the purpose of converging the weight coefficient faster.

In learning, when the word net 108 receives a word to be recognized therein, it supplies a teacher signal of;

$$(c_i, C_i) = (1, 0) \qquad (6)$$

when the word net 108 receives any other word, it supplies a teacher signal of;

$$(c_i, C_i) = (0, 1) \qquad (7)$$

In the learning of the word net 108, the weight coefficient of each link of the event net $E_{ij}$ is fixed. The learning continues until the weight coefficient of each link of the word net 108 is converged to a sufficient level.

To enhance the efficiency of recognition, the following method is executed. At first, the event net $E_{ij}$ and the word net 108 are linked to arrange a four layer or five layer perceptron type neural network. The arranged network employs the values obtained by the foregoing method as the initial value of the weight coefficient of each link. With this method, the weight coefficient of each link may be more finely adjusted than that adjusted with the single event net $E_{ij}$. When the event net $E_{ij}$ learns the word, it requires the teacher data for specific partial phonemes, resulting in making the learning result ambiguous and contradictory in light of the phoneme level. This method can correct these adversely-effective respects.

(C) Learning Method of the Super Net

Figure 8:
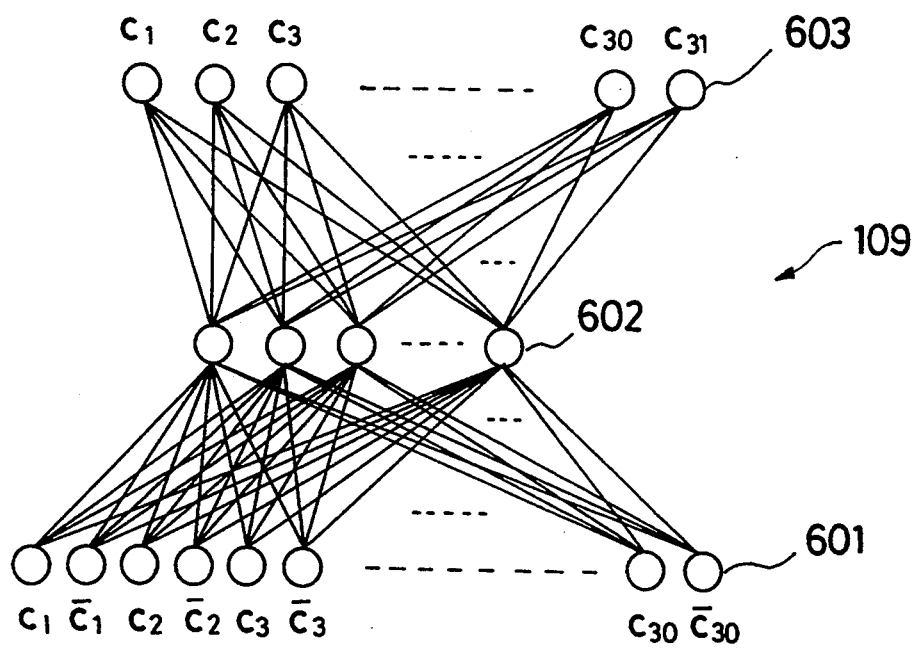
FIG. 8 is a view showing how a super net is arranged according to the first embodiment of the invention.

As shown in FIG. 8, the super net 109 consists of a three layer perceptron neural network. The input layer of the super net 109 includes 60 units, because the number of words to be recognized is 30 in this embodiment. The input-layer units 601 receive the output values sent from the word net 108. The middle-layer of the super net 109 includes 30 units 602. The output-layer includes 30 units 603 each matching to the category number of the words to be recognized and one unit representing "reject".

(a) If the input utterance is included in the recognition vocabulary, and assuming that the input utterance belongs to the category number 1, the super net 109 applies to the output-layer units $c_1, c_2, \ldots, c_{31}$ a teacher signal of;

$$(c_1, c_2, \ldots, c_1, \ldots, c_{31}) = (0, 0, \ldots, 1, \ldots, 0) \qquad (8)$$

That is, the teacher signal provides 1 with only the I-th unit and 0 with any other unit.

(b) If the input utterance is not included in the recognition vocabulary.

The super net 109 supplies to the output-layer units a teacher signal of;

$$(c_1, c_2, \ldots, c_{30}, c_{31}) = (0, 0, \ldots, 0, 11) \qquad (9)$$

That is, the teacher signal provides 1 with only the unit $c_{31}$ and 0 with any other unit.

With the aforementioned method, the weight coefficient of each link is obtained in each network.

Next, the description will be directed to the process of recognizing the word utterance. When the word utterance is input to the event net $E_{ij}$, the front endpoint and tail frames of the word are extracted by cutting out the power threshold values. The location of the central frame for each event net $E_{ij}$ is defined using the method wherein the word net 108 is used in learning. One event net $E_{ij}$ is shifted three times for selecting a maximum one of three output values $c_{ij}$ provided by three shifted event nets $E_{ij\text{-}1}, E_{ij\text{-}2}$ and $E_{ij\text{-}3}$. This operation is done for five event nets $E_{ij}$. As a matter of fact, it is done for all the event nets, the number of which is equal to the recognition vocabulary.

If the disposition of the event net $E_{ij}$ is defined, the input-layer unit of the event net $E_{ij}$ receiving the feature vector 110 results in providing the output value sent from the output-layer unit of the super net 109. The output value is sent to the recognized result determining section 112 in which the recognized result is obtained.

Figure 9:
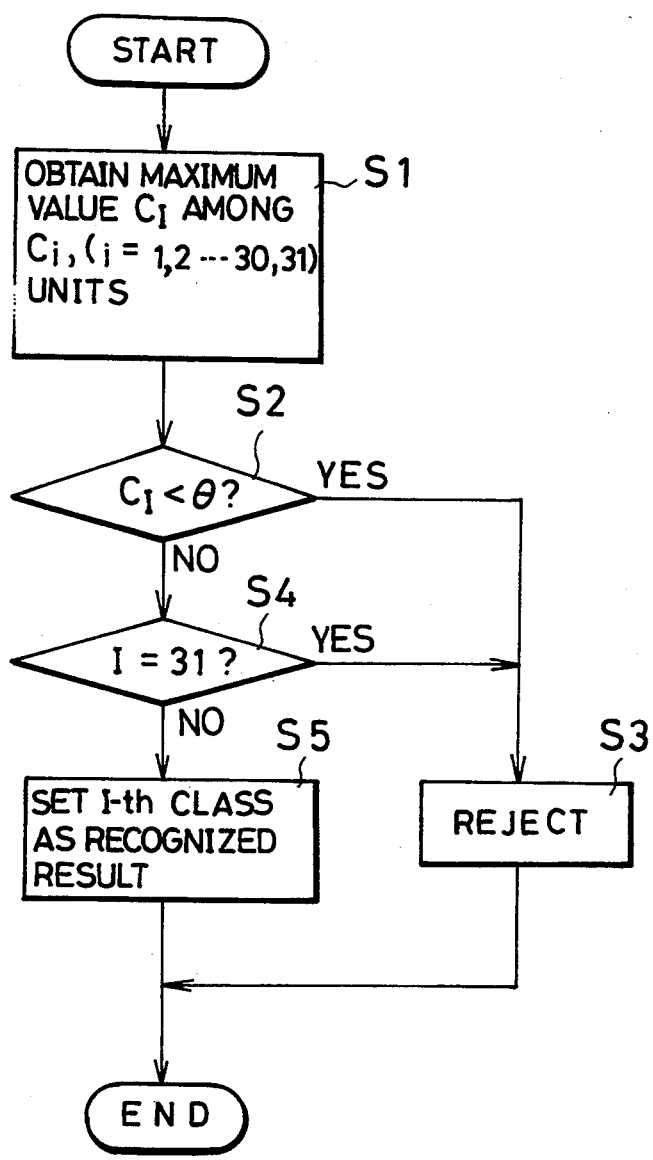
FIG. 9 is a flowchart showing how a recognized result determining section works according to the first embodiment of the invention.

The algorithm used for determining the result is shown in FIG. 9. In FIG. 9, the maximum output value $C_I$ of the super net 109 is rejected at a time. When the value $C_I$ is smaller than the predetermined threshold value $\theta$. In this embodiment, $\theta = 0.5$ is used.

In the above-mentioned process, at first, the maximum output value $C_I$ is obtained among the $C_i$ ($i=1, 2, \ldots, 30, 31$) units (step S1), then the obtained maximum output value $C_I$ is compared with a threshold value $\theta$ (step S2).

In step S2, in a case that the maximum output value $C_I$ is smaller than the threshold value $\theta$, then the value $C_I$ is rejected (step S3). On the other hand, in a case that the maximum output value $C_I$ is not smaller than the threshold value $\theta$, then the value I is checked whether or not it is equal to 31 (step S4).

In step S4, at a time when the value I is equal to 31, then the value $C_I$ is rejected (step S3). However, when the value I is not equal to 31, then the I-th class of the maximum output value $C_I$ is set as a recognized result (step S5).

Second Embodiment

Figure 10:
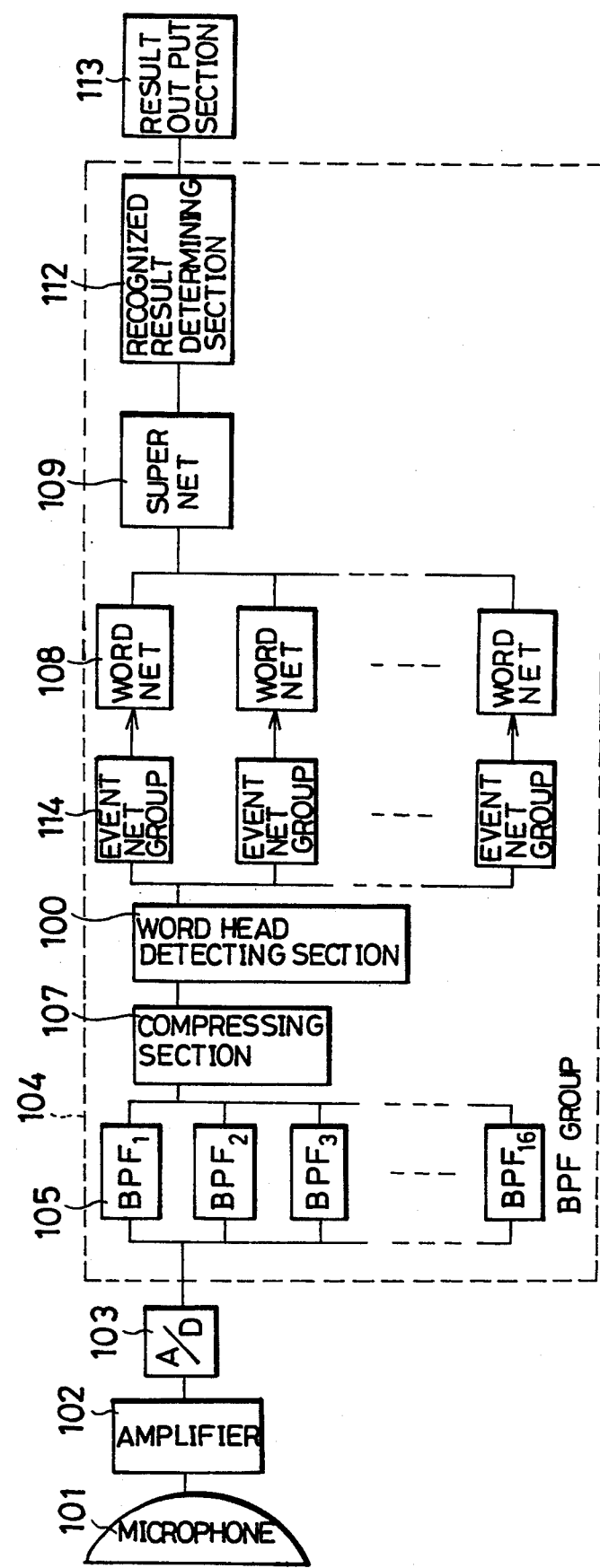
FIG. 10 is a block diagram showing a voice recognition apparatus according to a second embodiment of the invention.

Next, the voice recognition apparatus designed according to the second embodiment will be described with reference to FIGS. 10 to 12, in which the elements having the same numbers as those of the first embodiment indicate the same elements as described in the first embodiment.

In the apparatus, a voice is input at a microphone 101 and sent to an amplifier 102 at which it is amplified. Then, the amplified signal is converted into a digital signal in an A/D converter 103 and is applied to a frequency-analyzing section 104, in which a bandpass filter 105 serves to frequency-analyze the voice and output a power value at each frame, resulting in forming feature vectors. For reducing the network in size, the feature vectors are compressed by K-L transformation in a compression section 107 so that the dimensions of the feature vectors can be reduced.

The compressed feature vectors 106 are sent to a word-head detecting section 100 which serves to detect the front endpoint. If the front endpoint is detected as the start end of the input utterance, the word-head detecting section 100 send the word utterance to each event net 107 included in an event net group 114 (see FIGS. 11 and 12).

If, on the other hand, the front endpoint is not detected, the feature vectors 110 are not applied to the event net group 114.

The word-head detecting section 100 basically employs a short-period power as a detecting standard. The short-period power depends on whether or not a larger value than a threshold value is continued for a constant time or more. In addition, the word-head detecting section 100 may employ a low-pass power ratio and a high-pass power ratio, the latter two of which uses the number of zero crossings or the result analyzed by the bandpass filter.

The feature vector 110 is sent to the event net group 114 at a little earlier time than when the front endpoint is detected. Hence, the compression section 106 has to store the feature vector series 110' consisting of a plurality of compressed feature vectors 110, which feature vector series match to a predetermined number of frames (see FIGS. 10 and 11).

The feature vector 110 of the input utterance is input to each event net 107. The vent net 107 provides an output to each word net 108. The number of combination consisting of the event nets 107 and the word net 108 is equal to the number of categories included in the recognition vocabulary. Then, the output of the word net 108 is sent to a super net 109.

The defined area of the feature vector 110 of the input utterance is applied into an input layer of the event net 107. The defined area matches to an input frame 111 of the input layer. For inputting a specific word to the input layer, the input frame 111 is shifted N times on time axis so as to prepare N input frames 111 (N is a positive integer). In this embodiment, N is equal to five.

Then, how to shift the input frame 111 along a positive time axis will be discussed when the input voice is recognized.

Assuming that $E_{ij}$ denotes the j-th event net 107 for recognizing the i-th word category of the recognition vocabulary, the event net $E_{ij}$ has to units $c_{ij}$, $C_{ij}$ in the output layer.

When the event net $E_{ij}$ receives the partial phoneme series of the word (i-th word) to be recognized by $E_{ij}$ (Assuming that the time length of the word is 1, the partial phoneme series match to the length from the word head to the j/N-th phoneme), the event net $E_{ij}$ learns;

$$(c_{ij}, C_{ij}) = (1, 0) \qquad (8)$$

When it receives the other phonemes, the event net $E_{ij}$ learns;

$$(c_{ij}, C_{ij}) = (0, 1) \qquad (9)$$

It means that $C_{ij}$ has a high value at a certain time point of the word to be recognized by $E_{ij}$.

The shifting interval of the input frame 111 along the time axis matches to one frame of the compressed feature vector 110. If the shifting interval is designed to match to two frames, it results in reducing the amount of computations.

Assuming that the shifting amount of the input frame 111 along the time axis, that is, the number of the input frames 111 is n, $E_{ij}$ is referred to as $E_{ij1}, E_{ij2}, \ldots, E_{ijn}$ in sequence from the start, which respectively provide the outputs of $C_{ij1}, C_{ij2}, \ldots, C_{ijn}$. Then, the maximum value of n outputs is sent to the word net 108.

The value of n depends on $E_{ij}$. In this embodiment, as shown in FIG. 11, n is 5 for $E_{i1}$ and n is 7 for $E_{i2}$. The searching area of each event net 107 is indicated by a horizontal arrow bar. The bold real line indicates the location at which the maximum value of $C_{ij1}$ (j=1, 2, ..., 5) is selected. For example, for $E_{i1}$, $E_{i12}$ is selected and for $E_{i2}$, $E_{i25}$ is selected.

The searching area of $E_{i1}$ may be defined to have the constant amount, for example, respective three frames before and after the detected front endpoint or to have a constant number of times as long time as a standard deviation of a word time length determined according to the statistic based on many and unspecified speakers.

The searching area of $E_{ij}$ (j>1) can be derived on an average m and a standard deviation $\sigma_j$ of a time difference between $E_{ij}$ and $E_{ij-1}$ (a symbol of — is effective in only "j") predetermined on the statistic. How to derive it will be discussed below. The average m is constant independently of j. The location of $E_{ij-1}$ depends on the maximum one of $C_{ij-1}, C_{ij-2}, \ldots, C_{ij-n}$. For example, in FIG. 10, $C_{i12}$ is the maximum value for j=2.

The searching area of $E_{ij}$ ranges from n-k$\sigma_j$ to m+k$\sigma_j$ based on the maximum location of $C_{ij-1}$, wherein K is a constant such as 2 or 3. If the maximum location of $C_{ij-1}$ is smaller than m-k$\sigma_j$, the searching area can be defined as m-k$\sigma_j$. That is, assuming that the searching area is defined as $(L_j, R_j)$, Lj and Rj are represented as;

$$L_j = \text{MAX (m-k}\sigma_j\text{, maximum location of } C_{ij-1})$$

$$R_j = m + K\sigma_j$$

Figure 11:
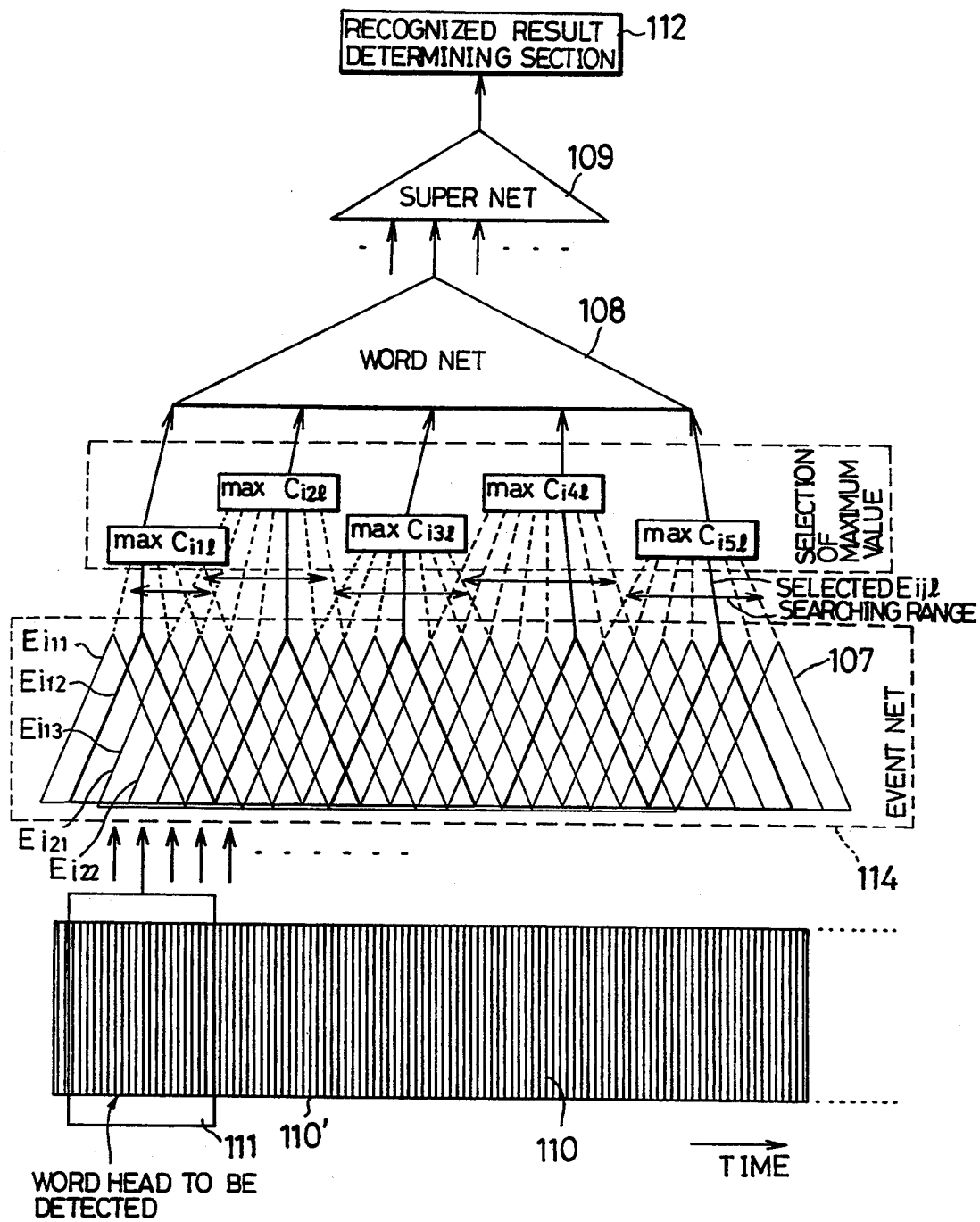
FIG. 11 is a view showing how nets are arranged according to the second embodiment of the invention.
Figure 12:
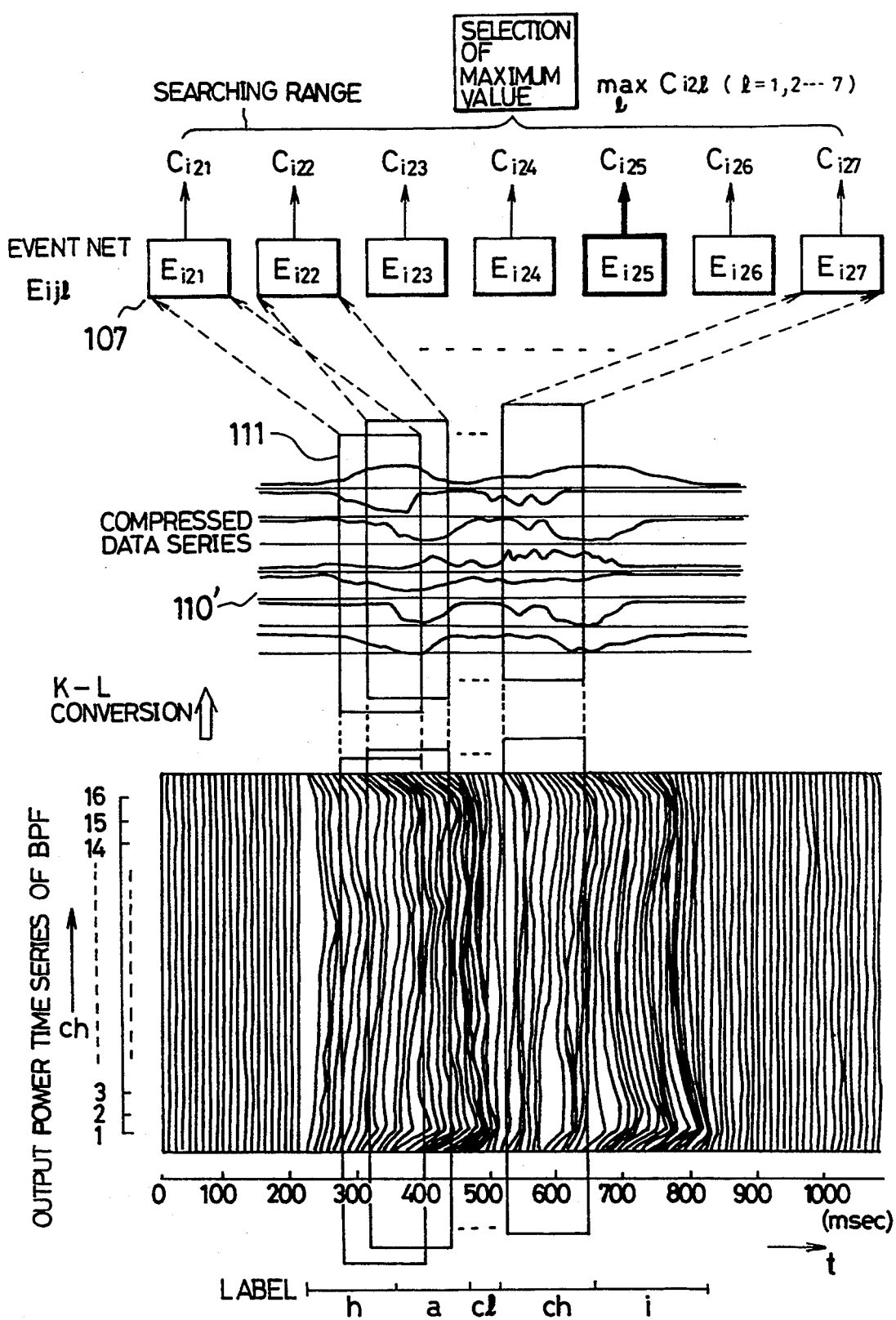
FIG. 12 is a view showing how a word "hachi" (meaning "a bee") is processed in the second embodiment of the invention.

FIG. 12 shows the relation between the time series of a power output by the 16-channel bandpass filter and the input frame 111 input to the event net $E_{ij}$. In the portion representing the power 301 output by the 16-channel bandpass filter (the lower half portion of FIG. 11), the vertical axis indicates a channel number of the bandpass filter and the horizontal axis indicates a time. Each curve is sketched along the output values given by the sixteen channels.

FIG. 11 shows how the event net $E_{i2}$ is shifted on time axis. As shown, the event net $E_{i2}$ is shifted to $E_{i2-1}$, $E_{i2-2}$ and $E_{i2-3}$ which respectively receive the feature vectors formed by the input frame 111 and supply the values $c_{i21}, c_{i22}, \ldots c_{i27}$. The put out of the event net $E_{ijl}$ (l=1, 2, ..., 7) providing the maximum value is applied to the input-layer unit of the word net 108.

Herein, a bold real line indicates $E_{i25}$ from which the maximum value is output. A label represents the phoneme symbols of a speech sample "hachi" (meaning "bee" in Japanese) in a manner that h matches to [h], a to [a], cl to a silent section, ch to [t∫] and i to [i].

Turning to FIG. 12, since $E_{i12}$ is selected, the searching area of $E_{i2}$ starts from $E_{i13}$. 1 is defined from 1 to 7 based on the aforementioned time interval information.

For j=2, the maximum value $C_{i25}$ of $C_{i21}, C_{i22}, \ldots, C_{i27}$ is selected.

When selecting the maximum value, the following transformations may be considered on the quality and computing amount of the event net without being uniquely defined to MAX ($C_{ij1}$).

First, if the values of $C_{ij1}$ (l=1, 2, ..., n) are all small, the center of the searching range, that is, 1=m can be selected without selecting the maximum value. The selection allows unnecessary matching to be prevented if any word except the one to be recognized by $E_{ij}$ is input. It results in enhancing a "reject" capability.

Second, if the values of $C_{ij1}$ (l=1, 2, ..., n) are all large, like the first transformation, 1=m can be selected. This selection allows unnatural matching to be prevented if the similar feature vectors are kept long, which case may result from long vowels, for example.

Third, if the values of $C_{ij1}$ (l=1, 2, ..., n) are all small, the searching area is made wider by a constant amount α to m=m+α. Then the value of $C_{ij1}$ is obtained about l=m+1, m+2, ... m+α for selecting the maximum value of the obtained values. This selection is effective especially in a sample voiced slowly.

Fourth, when the values of $C_{ij}$ are all small until the j-th event net, without computing the event nets later than (j+1)th one, (0,1) is provided to the word net connecting those event nets. That is, this method is designed to stop the computation when the i-th word is being processed and start the processing of the (i+1)th word. The proper value of j is 2 or 3. If the recognition vocabulary has a small number of analogous words to the input utterance, the computing amount is reduced to about a half.

As set forth above, the event net 107 serves to output a value matching to similarity between the feature vector 110 of the input frame 111 and the partial phoneme series of a specific word to be recognized by the event net 107. The outputs of the five event nets 107 are all applied to the input layer of the word net 108. The word net 108 serves to output a value matching to similarity between the input utterance and a specific word to be recognized by the word net 108. Hence, assuming that the recognition vocabulary has 30 words, it is natural that 30 word nets 108 are prepared. All the outputs are input to the input layer of the super net 109. The super net 109 provides at the output layer 30 units matching to the category numbers of the words to be recognized and one unit representing "reject". If the input utterance is included in the recognition vocabulary, the super net 109 serves to define a weight coefficient of each link so that the output-layer unit matching to the category number can supply the largest output value among the other output-layer units.

If, on the other hand, the input utterance is not included in the recognition vocabulary, the super net 109 serves to define a weight coefficient of each link so that the output-layer unit representing "reject" can supply the largest output value among the other output-layer units. The output of the super net 109 is sent to a recognized result-determining section 112 which serves to retrieve and output the unit number of the output-layer units of the super net 109 providing the largest output. The output unit number is input to a result output section 113 in which the recognized result is displayed.

The overall flow from the frequency analyzing section 104 to the recognized result determining section 113 may be built on a digital signal processor.

In actual voice-recognizing process, the computation of the event net $E_{i1}$ of each reference pattern is started immediately after the front endpoint is detected. That is, $E_{i1}, E_{i2}, \ldots, E_{i5}$ are computed synchronously as $E_{i1}, E_{i2}, \ldots, E_{i5}$ sequentially receive the feature vectors to be recognized by each event net $E_{i1}$.

Next, immediately after $E_{i5}$ finishes its computation, without awaiting the finish of another event net, the corresponding word net 108 starts its computation. When all the word nets 108 finishes their computations, the super net 109 starts to compute, after which the control is shifted to the recognized result determining section.

Unlike the normal apparatus, which starts the recognition processing after a word tail is detected, the present voice recognition apparatus starts the processing immediately after a front endpoint is detected and activates the event net $E_{ij}$ to do recognition processing along the time when a word is being voiced, thereby greatly reducing the recognition-response time.

In this embodiment, how the event net, the word net and the super net obtain a weight coefficient of each link of the neural network, that is, the learning method of the neural network is the same as that described in the first embodiment. Refer to (A) Learning Method of the Event Net, (B) Learning Method of the Word Net, and (C) Learning Method of the Super Net described about the first embodiment.

Third Embodiment

Figure 13:
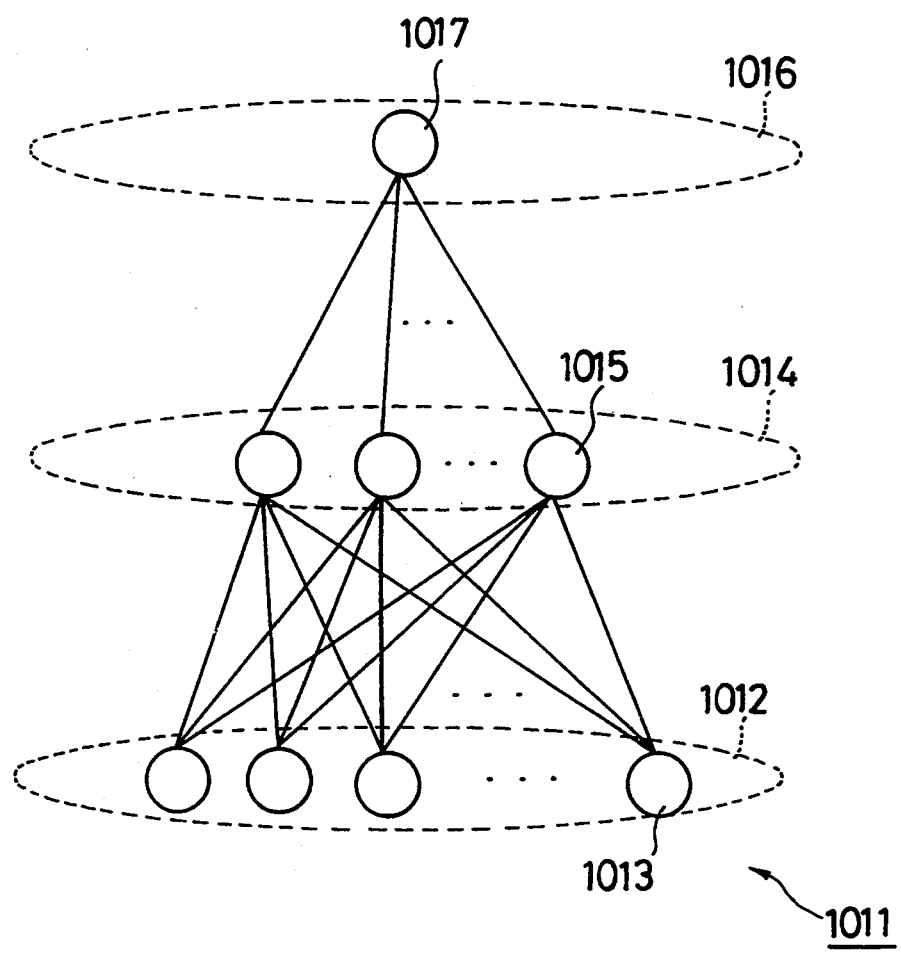
FIG. 13 is a view showing how a word net is arranged according to a third embodiment of the invention.

FIG. 13 shows arrangement of a word net included in the voice recognition apparatus designed according to the third embodiment.

1011 denotes a word net which consists of three layer perceptron type neural network. The input layer 1012 of the word net 1011 has five units 1013, the middle layer 1014 has five units 1015, and the output layer 1016 has one unit 1017. The number of the middle-layer unit 1015 depends on how complicated the divided areas of the middle layer 1014 are.

The output of the middle-layer unit 1015 is produced by converting the sum of the outputs of the input-layer units 1013 connected to the unit 1015 itself based on a sigmoid function. The output of the output-layer unit 1016 is analogously produced by converting the sum of the outputs of the middle-layer units 1015 connected to the unit 1017 itself based on the sigmoid function.

Then, the description will be directed to the initial learning method of the word net 1011.

(A) Initial Learning of the Word Net a. First Learning Method

Figure 23:
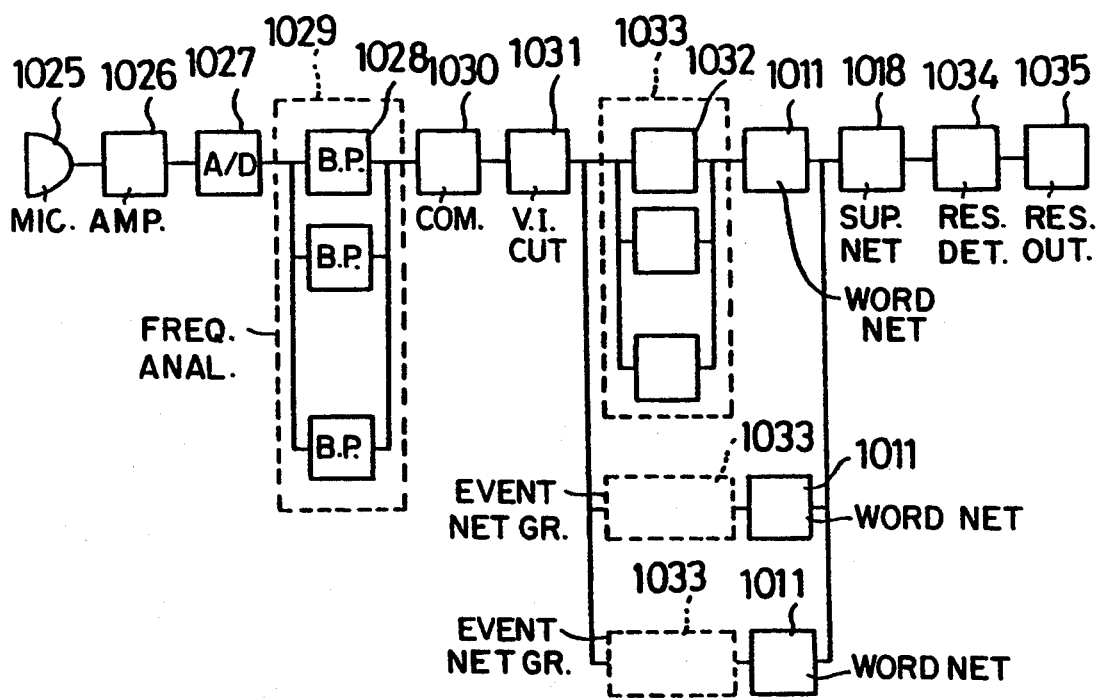
FIG. 23 is a block diagram showing the voice recognition apparatus according to the third embodiment of the invention.

It is assumed that one event net group 1033 (see FIG. 23) consists of five event nets 1032 (see FIG. 23). Each event net 1032 has one unit in the output layer.

The output-layer units of each event net 1032 learn in a manner that it can supply a value of 1 when the partial phoneme series to be recognized are input to the event net 1032, while it can supply a value of 0 when the other phoneme series are input thereto.

The word net 1011 receives an output sent from the output-layer unit of the event net 1032. Then, the word net 1011 determines whether or not the word to be recognized is input. If yes, it supplies a value of 1 and, if no, a value of 0.

When the input series (1,1,1,1,1) is input to the word net 1011, the word net is designed to supply an output value of 1. When the other input series, that is, those including at least one value of 0 such as (0,0,0,0,0), (0,0,0,0,1), ..., (1,1,1,1,0) are input to the word net, it supplies an output value of 0.

The word net 1011 thus learns in a manner that when (1,1,1,1,1) is input to the input layer 1012 of the word net 1011, a teacher signal of 1 is supplied to the output layer 1016, while when the other input series are input thereto, a teacher signal of 0 is supplied to the output layer 1016. It results in being able to obtaining a connecting coefficient between a unit of one layer and a unit of another layer.

Figure 14:
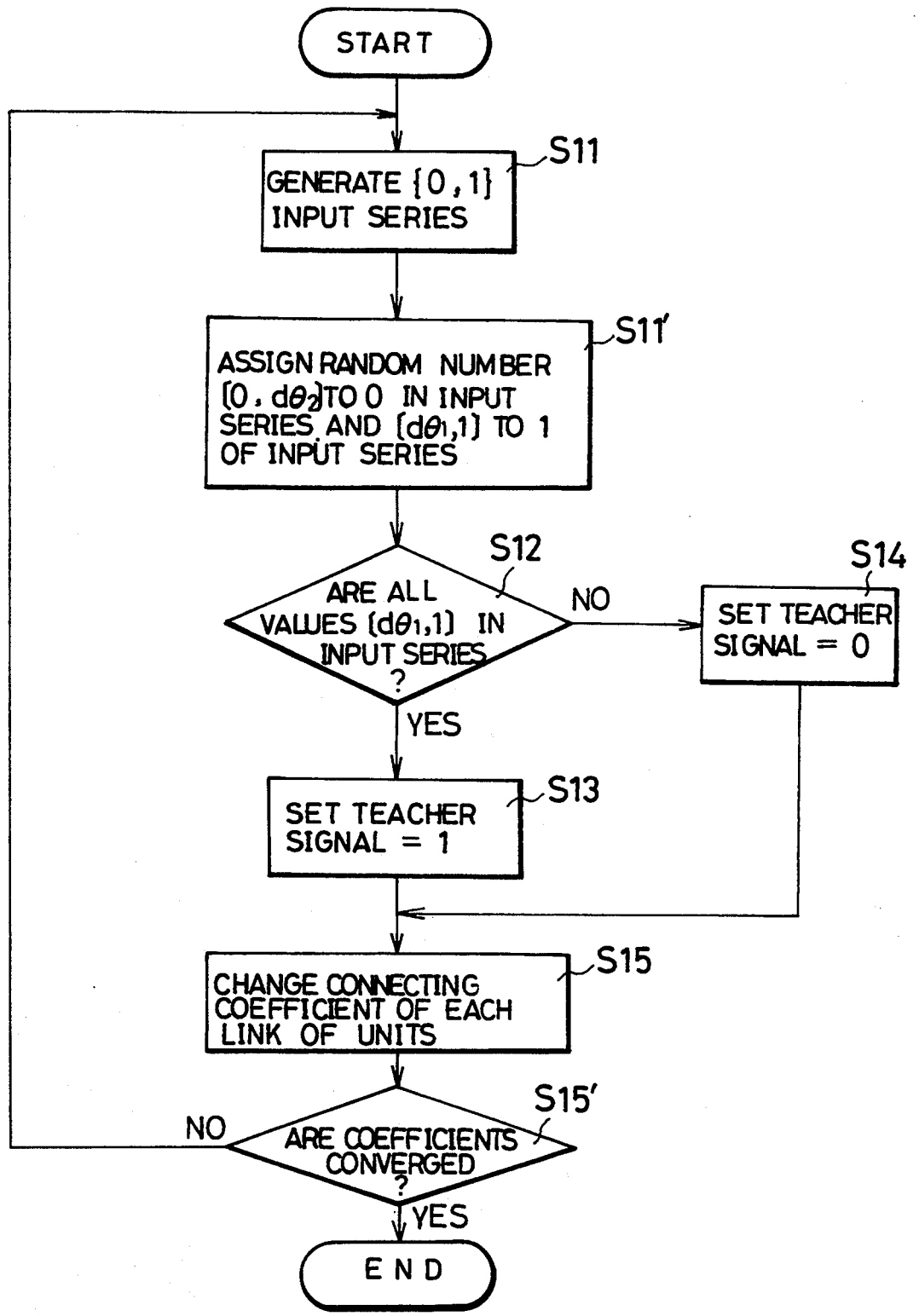
FIG. 14 is a flowchart showing how the word net learns.

Turning to FIG. 14, the initial learning operation of the word net flows as follows. At first, the input series of {0,1} is generated (step S11). Since the value of [0,1] is allowed as an output value of the event net 1032, a random number of [0, $d\theta_2$] is assigned to a value of 0 contained in the input series and a random number of [$d\theta_1$, 1] is assigned to a value of 1 contained therein. These random numbers are sent to the input layer 1012 (step S11'). Then, it is determined whether or not the values input to the input unit 1013 are all [$d\theta_1$, 1] (step S12). If yes, a teacher signal of 1 is given to the output layer 1016 (step. S13). If no, a teacher signal of 0 is given to the output layer 1016 (step S14). Next, the operation corrects a connecting coefficient between both layers, that is, a connecting coefficient between a unit of one layer and a unit of another layer with the error back propagation method (step 15). The error back propagation keeps going on until the coefficient is focused.

Figure 15:
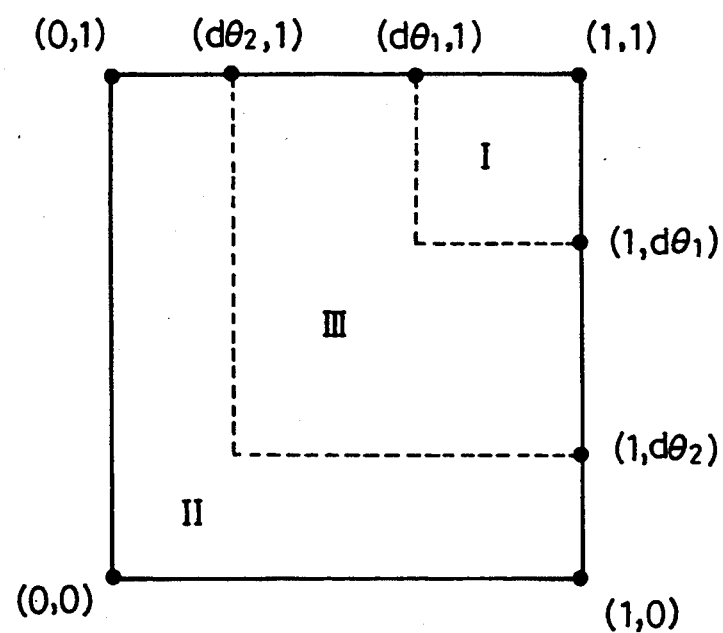
FIG. 15 is a view showing an input pattern of the word net used in the learning method of FIG. 14.

FIG. 15 shows the input space of the word net 1020 used in the first learning method. Herein, the word net 1020 receives two inputs. In this learning method, an area I learns the teacher signal of 1, an area II learns the teacher signal of 0, and an area III does not learn.

b. Second Learning Method

Figure 16:
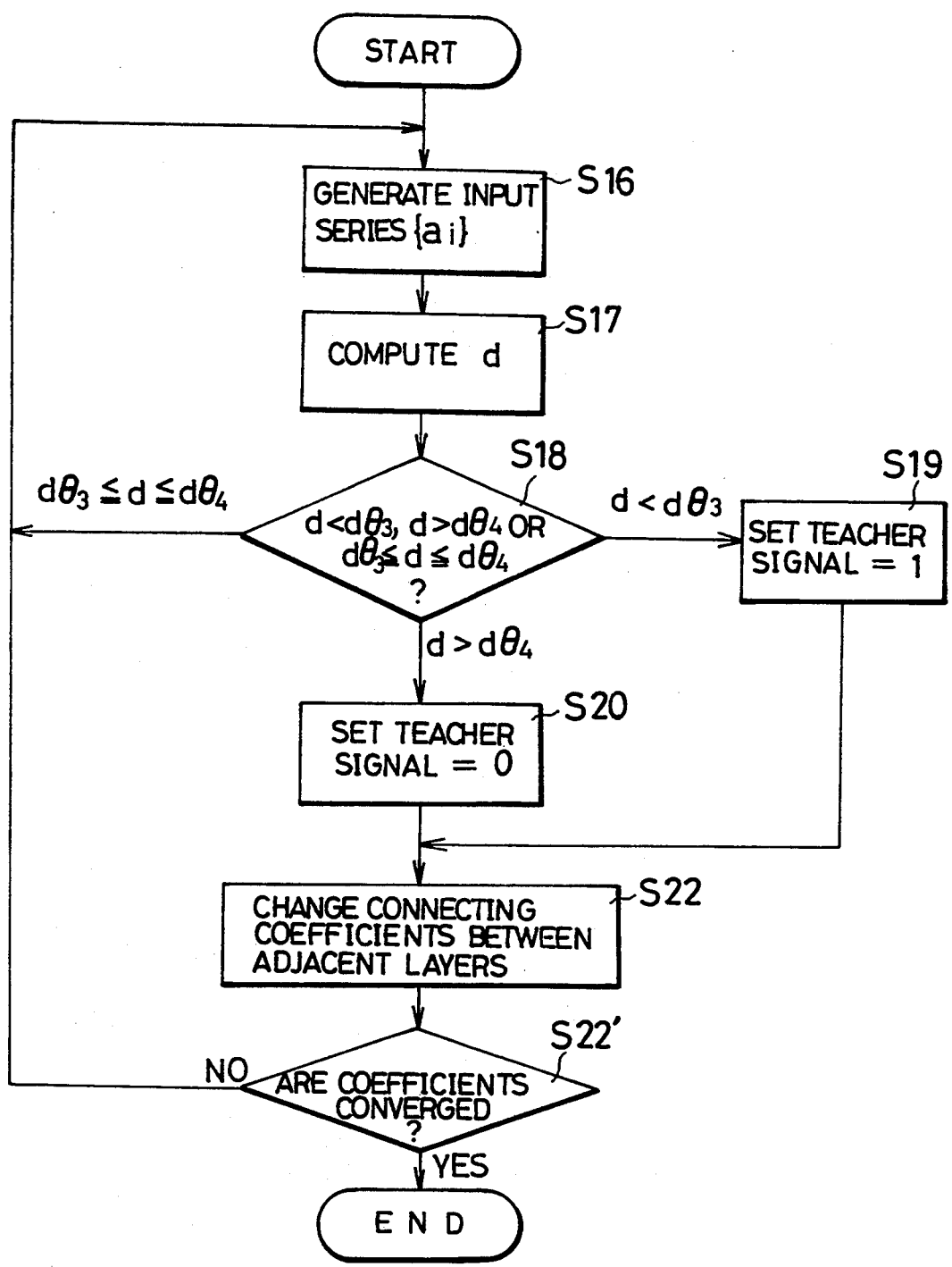
FIG. 16 is a flowchart showing how the word net learns.

With reference to FIG. 16, the description will be directed to the second learning method of the word net which makes it possible to more enhance a recognizing capability.

An input series $\{a_i\}$ consisting of a random number is input to the input layer 1012 (step S16). For the input series $\{a_i\}$, d is given by the equation;

$$d = \sqrt{\sum_{i=1}^{5}(1-a_i)^2} \tag{X}$$

wherein $0 \leq a_i = 1$ (step S17). d is used for determining the following relations;
 (1) $d < d\theta_3$ a teacher signal = 1 (step S19)
 (2) $d > d\theta_4$ a teacher signal = 0 (step S20)
 (3) $d\theta_3 \leq d \leq d\theta_4$ not doing the learning The connecting coefficient between both layers is corrected with the error back propagation method (step S22). The error back propagation keeps going on until the coefficient is converged (step S22').

$d\theta_1$, $d\theta_2$, $d\theta_3$ and $d\theta_4$ are constants obtained on the number of units provided in the input layer 1012 of the word net 1011 and how the output value of the event net 1032 is distributed. Herein, it is assumed that $d\theta_1 = 0.75$, $d\theta_2 = 0.25$, $d\theta_3 = 0.25$, and $d\theta_4 = 0.75$.

Figure 17:
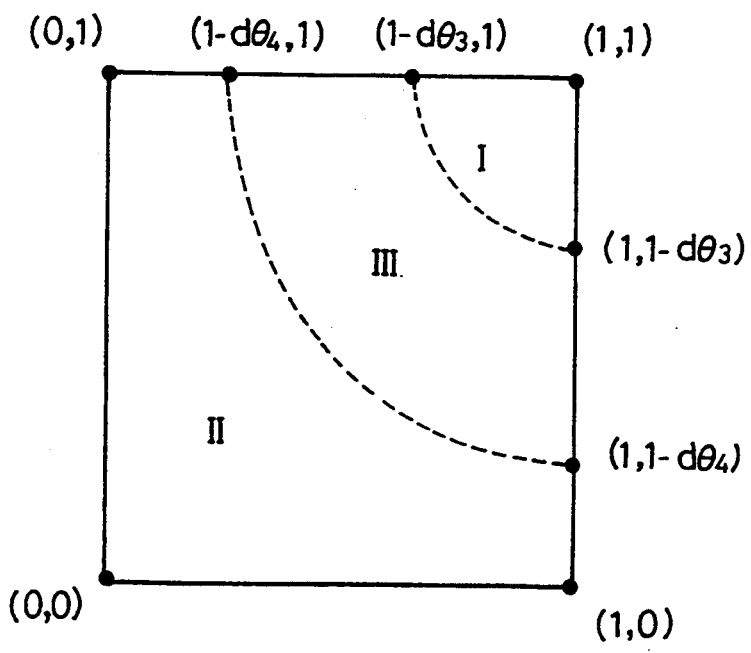
FIG. 17 is a view showing an input pattern of the word net used in the learning of FIG. 16.

FIG. 17 shows the input space of the word net 1011 used in the second learning method. Herein, the word net has two inputs.

In FIG. 17, the area I matches to the case of the foregoing relation (1), the area II matches to the case of the relation (2), and the area matches to the case of the relation (3).

Figure 18:
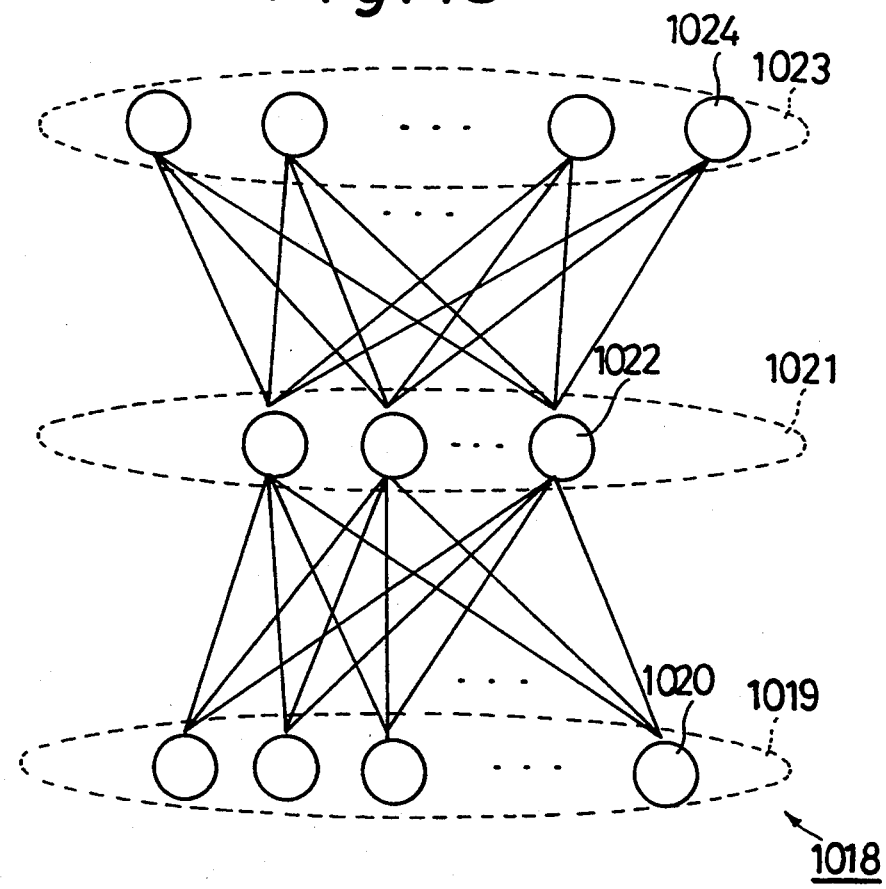
FIG. 18 is a view showing how a super net is arranged according to the third embodiment of the invention.

FIG. 18 shows the arrangement of the super net.

As shown, the super net 1018 consists of a three layer perceptron type neural network. The input layer 1019 of the super net 1018 has thirty units 1020, the middle layer 1021 has thirty units 1022, and the output layer 1023 has thirty-one units.

The number of the middle-layer unit 1022 depends on how complicated the divided areas of the middle layer are.

The output of the middle-layer unit 1022 is produced by converting the sum of the outputs of the input-layer units 1020 connected to the unit 1022 itself based on a sigmoid function. The output of the output-layer unit 1024 is analogously produced by converting the sum of the outputs of the middle-layer units 1022 connected to the unit 1024 itself based on the sigmoid function.

Then, the description will be directed to the initial learning method of the super net 1018.

(A) Initial Learning of the Super Net a. Third Learning Method

Assuming that the number of the word to be recognized is 30, the super net 1018 has 30 input-layer units 1020 matching to the number of the word nets 1011.

The number of the output-layer units 1024 of the super net 1018 matches to the category number of the recognition vocabulary. That is, when the i-th (i is a positive integer) category word is input to the input layer 1019 of the super net 1018, the i-th unit of the output layer 1023 supplies the largest output value among the other output-layer units 1024.

The 31-th unit of the output layer 1023 supplies the largest output value when the other words except those to be recognized are input to the input layer 1019 of the super net 1019.

To make the super net 1018 learn, when the super net 1018 receives the input series (0, 0, ..., 0, 1 [i-th], 0, ..., 0) having a value of 1 only at the i-th output unit 1024, a teacher signal of (0, 0, ..., 0, 1 [i-th], 0, ..., 0, 0) having a value of 1 only at the i-th output unit 1024 is given to the output layer 1023.

When the super net 1018 receives the input series (0, 0, ..., 0) having all zeros or (0, ..., 0, 1, 0, ..., 0, 1, 0, ...) having two or more values of 1, a teacher signal (0, 0, ..., 0, 1) having a value of 1 at the 31-th output unit 1024 is given to the output layer 1023. The teacher signal is referred to as a reject teacher signal. It results in being able to obtaining a connecting coefficient between a unit of a layer and a unit of another layer.

Figure 19:
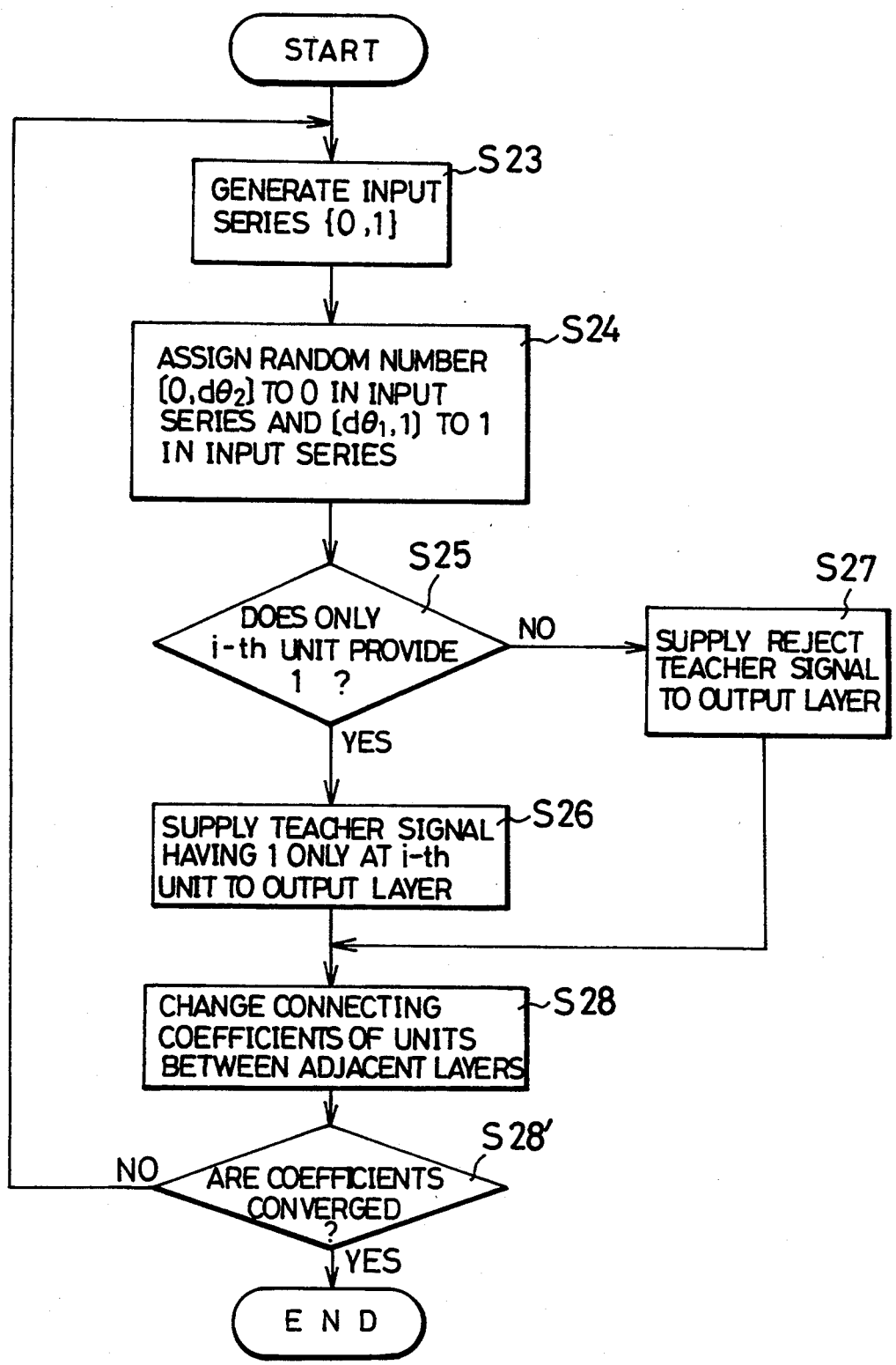
FIG. 19 is a flowchart showing how the super net of FIG. 18 learns.

FIG. 19 shows the third learning method of the super net 1018.

At first, the input series of $\{0,1\}$ is generated (step S23). Since the value of [0,1] is allowed as an output value of the word net 1011, a random number of $[0, d\theta_5]$ is assigned to a value of 0 contained in the input series and a random number of $[d_{74\ 6}, 1]$ is assigned to a value of 1 contained therein. These random numbers are sent to the input layer 1012 (step S24). Then, it is determined whether or not (0, ..., 0, 1, 0, ..., 0) is the input series having a value of 1 only at the i-th output unit 1024 (step S25). If yes, a teacher signal of (0, ..., 0, 1, 0, ..., 0) having a value of 1 only at the i-th output unit 1024 is given to the output layer 1023 (step S26). If no, a reject teacher signal of (0, ..., 0, ..., 0, 1) having a value of 1 only at the 31-th output unit 1024 is given to the output layer 1023 (step S27). Then, the operation corrects a connecting coefficient between a unit of one layer and a unit of another layer with the error back propagation method (step S28). The error back propagation is kept in operation until the coefficient is focused (step S28').

Figure 20:
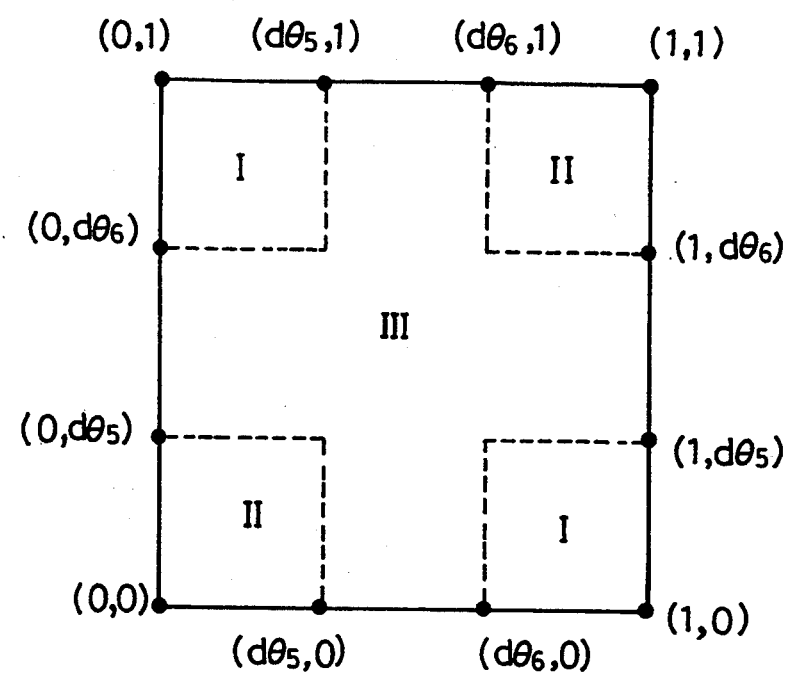
FIG. 20 is a view showing an input pattern of the super net in the learning method of FIG. 19.

FIG. 20 shows the input space of the super net 1018 used in the third learning method. Herein, the super net 1018 receives two inputs.

In the third learning method, an area I learns the teacher signal of (0, 0, ..., 1, 0, 0) having a value of 1 only at the i-th output unit 24, an area II learns the teacher signal of (0, 0, ..., 0, ..., 0, 1) having a value of 1 only at the 31-th output unit 1024.

b. Fourth Learning Method

Figure 21:
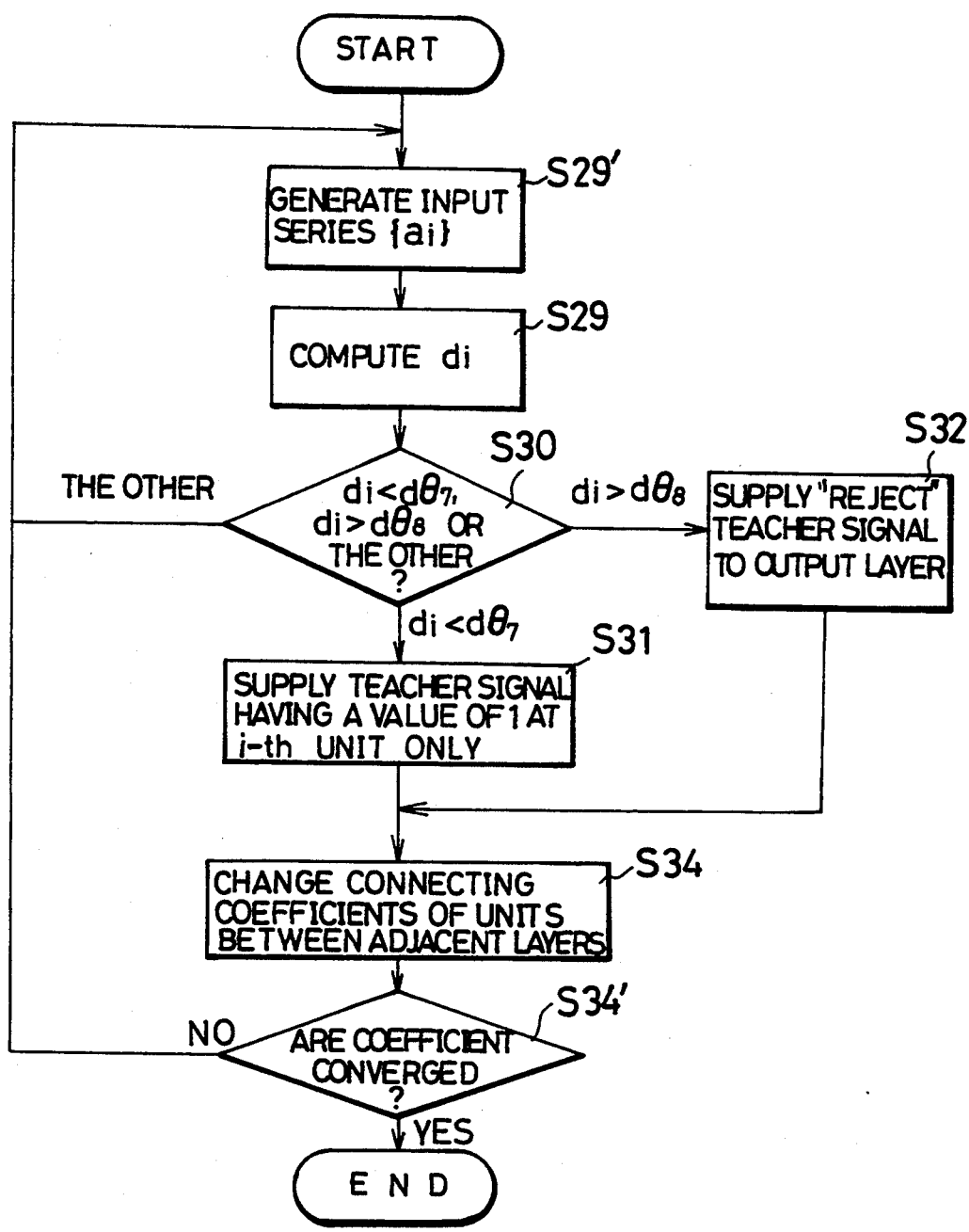
FIG. 21 is a view showing how the super net of FIG. 17 learns in another manner.

With reference to FIG. 21, the direction will be directed to the fourth learning method of the super net which makes it possible to more enhance a reject capability.

This learning method of the super net flows as follows. At first, an input series $\{a_i\}$ is created with a random number and is input to the input layer 1019 (step S29'). For the input series $\{a_i\}$, $d_i$ is given by the equation;

$$d_i = \sqrt{(1-a_i)^2 + \sum_{j=1, j \neq i}^{30} a_j^2} \tag{X}$$

wherein $0 \leq a_i \leq 1$ (step S29). The value of $d_i$ is used for determining the following relations (step S30).
 (4) If only one value of i meets the relation of $d_i < d\theta_7$, the teacher signal is (0, ..., 0, 1, 0, ..., 0, 0) It means that only the i-th value has 1 (step S31).
 (5) If all the values of i meets the relation of $d_i > d\theta_8$, the teacher signal is (0, ..., 0, 0, 0, ..., 0, 1) It means that only the 31-th value has 1 (step S32)
 (6) The other case not doing the learning As the super net 1018 is doing the learning, the connecting coefficient between both layers is being corrected with the error back propagation method (step S34). The error back propagation method is kept in operation until the coefficient is focused (step S34').

$d\theta_5$, $d\theta_6$, $d\theta_7$ and $d\theta_8$ are constants which are obtained on the number of units 1020 provided in the input layer 1019 of the super net 1018 and how the output value of the word net 1011 is distributed. Herein, it is assumed that $d\theta_5 = 0.25$, $d\theta_6 = 0.75$, $d\theta_7 = 0.25$, and $d\theta_8 = 0.75$.

Figure 22:
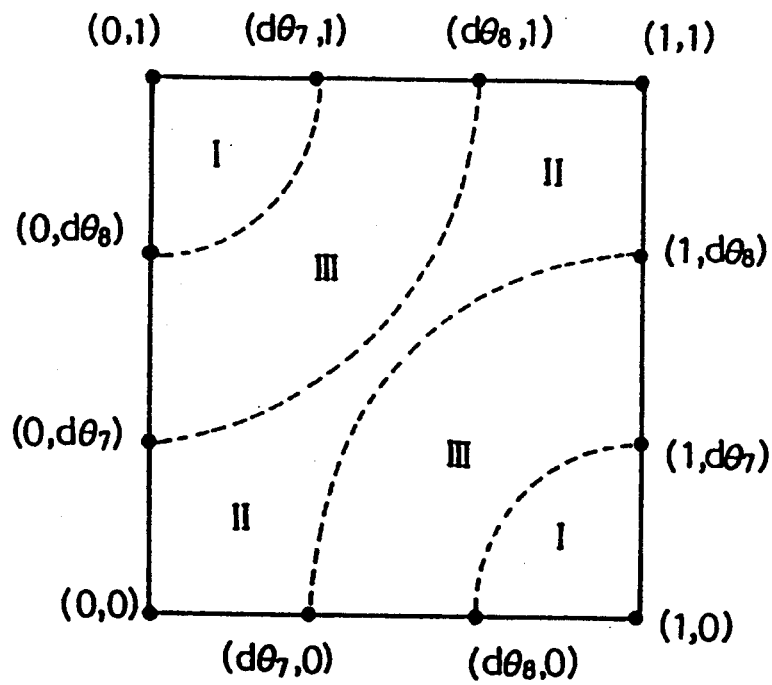
FIG. 22 is a view showing an input pattern of the super net of FIG. 21.

FIG. 22 shows the input space of the space net 1018 used in the third learning method. Herein, the super net has two inputs.

In FIG. 22, the area I matches to the foregoing relation (4), the area II matches to the relation (5), and the area matches to the relation (6).

The resulting connecting coefficient between the input-layer unit 1020 of the super net 1018 and the output-layer unit 1017 of the word net 1011 may be used as the connecting coefficients between the adjacent layers of the word net 1011 and between the adjacent layers of the super net 1018. To recognize the input utterance more efficiently, with the resulting connecting coefficient being used as an initial value, it is necessary to make the word net 1011 learn the output value of the event net 1032 based on the actual input utterance and the super net 1018 learn the output value of the word net 1011 based on the actual input utterance. The resulting correcting coefficient makes it possible to recognize the voice better.

The foregoing learning methods are used for not only the voice recognition apparatus but also a character pattern recognition apparatus.

FIG. 23 shows one arrangement of a voice recognition apparatus providing the word net 1011 and the super net 1018.

The voice recognition apparatus shown in FIG. 23 includes a microphone 1025, amplifier 1026 connected to the microphone 1025, an analog-to-digital converter (referred to as an A/D converter) connected to the amplifier 1026, a frequency-analyzing section 1029 connected to the A/D converter 1027, the frequency-analyzing section 1029 having a plurality of bandpass filters 1028 located in parallel, a compression section 1030 connected to the frequency-analyzing section 1029, a voice interval cutting section 1031 connected to the compression section 1030, a plurality of event net groups 1033 connected to the voice interval cutting section 1017, the event net group 1033 having a plurality of event nets 1032 located in parallel, a plurality of word nets 1011 respectively connected to the event net groups 1033, a super net 1018 connected to the word nets 1011, a recognized result determining section 1034 connected to the super net 1018, and a result output section 1035 connected to the recognized result determining section 1034.

Then, the description will be directed to how the voice recognition apparatus works.

A word utterance is input through the microphone 1025 to the amplifier in which it is amplified. The amplified voice is converted into a digital signal in the A/D converter 1027. Then, the digital signal is sent to the frequency-analyzing section 1029 in which the digital voice signal is frequency-analyzed through the bandpass filters 1028 and each bandpass filter 1028 outputs a power at the corresponding frame.

For reducing the network in scale, the resulting feature vectors of the input utterance is sent to the compression section 1030 in which the feature vectors are compressed for reducing the dimensions of the feature vectors by the K-L transformation.

The compressed data is sent to the voice interval cutting section 1031 in which the voice interval of the input utterance is defined. The feature vectors contained in each voice interval are sent to the corresponding event net 1032.

As mentioned above, a plurality (herein, five) of event nets 1032 are provided. The feature vectors are input to each event net 1032 as they are being moved within a predetermined range at a predetermined rate. The largest value is selected as a true output among the outputs of the event nets 1032, The largest value means the largest similarity between the input feature vectors and the partial phoneme series of a word to be recognized by each word net 1032.

The largest one of the outputs supplied from the event nets 1032 is sent to the corresponding word net 1011. The plurality of event nets 1032 connected to one word net 1011 are referred to as an event net group 1033. The number of combinations of the event net group 1033 and the word net 1011 corresponds to the number of the words included in the recognition vocabulary.

The word net 1011 supplies an output to the super net 1018. The super net 1018 supplies an output to the recognized result determining section 1018.

The recognized result determining section 1034 serves to retrieve and output the number of the unit providing the largest output among the output-layer units 1024 of the super net 1018. The output number of unit is input to the result output section 1035 in which the recognized result is displayed.

Fourth Embodiment

Then, the description will be directed to a fourth embodiment of the invention with reference to FIGS. 24 to 28, in which the same reference numbers as those shown in the third embodiment indicate the same elements.

Figure 24:
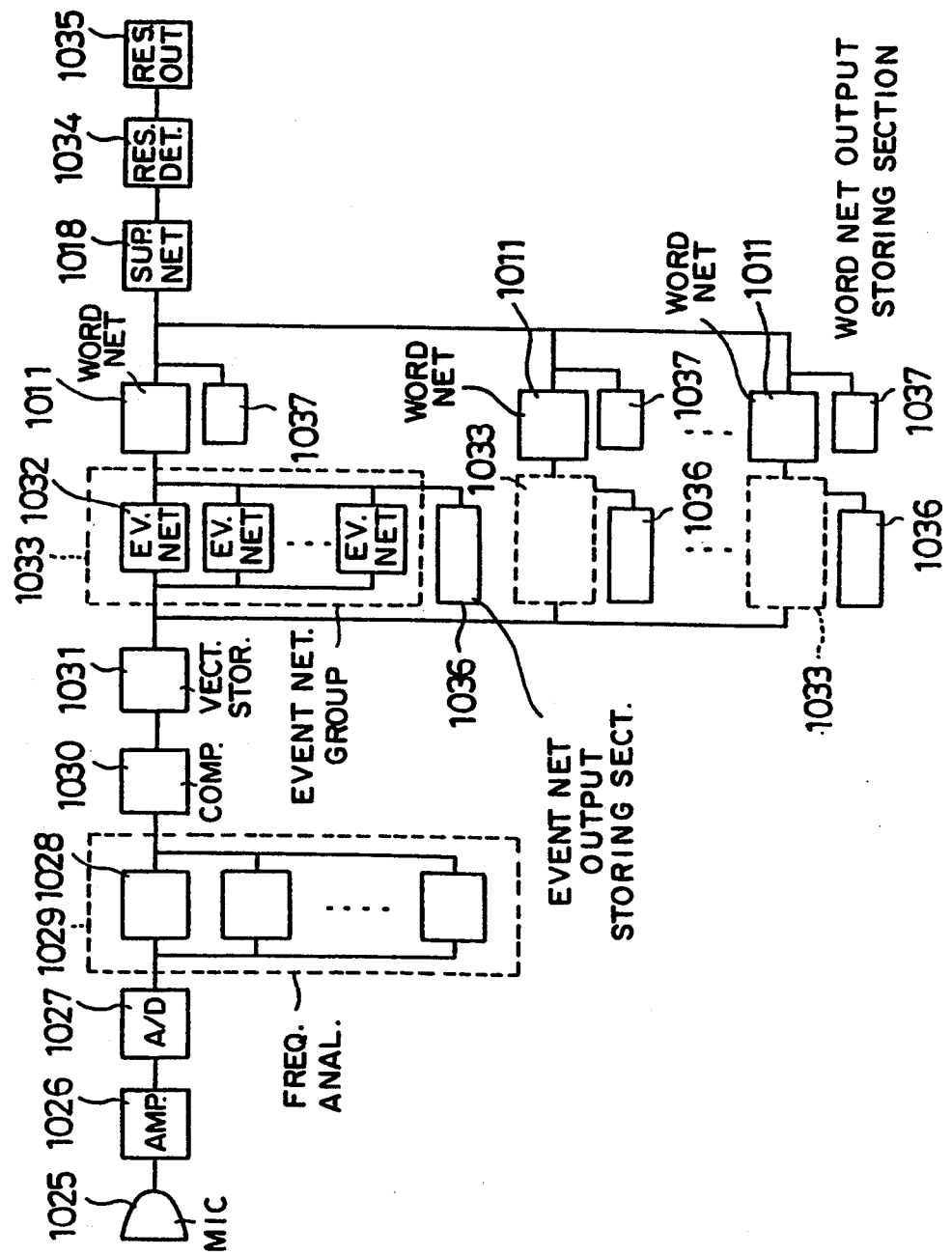
FIG. 24 is a block diagram showing a voice recognition apparatus according to a fourth embodiment of the invention.
Figure 25:
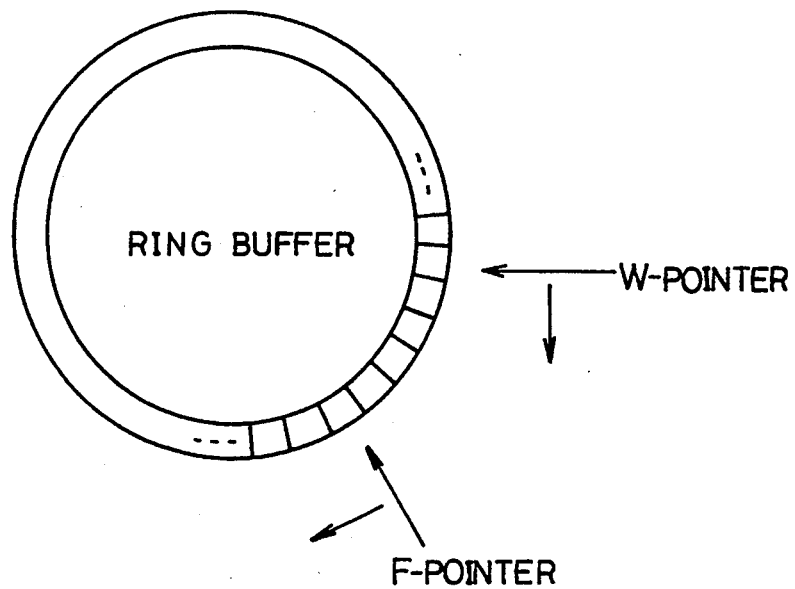
FIG. 25 is a view showing a feature vector storing section included in the voice recognition apparatus.

FIG. 24 shows arrangement of a voice recognition apparatus designed according to the fourth embodiment.

The voice recognition apparatus shown in FIG. 24 includes a microphone 1025, an amplifier 1026 connected to the microphone 1025, an analog-to-digital converter (referred to as an A/D converter) 1027 connected to the microphone 1025, a frequency-analyzing section 1029 connected to the A/D converter 1023, the frequency-analyzing section 1029 having a plurality of bandpass filters 1028 disposed in parallel, a compression section 1030 connected to the frequency-analyzing section 1029, a feature vector storing section 1031 connected to the compression section 1030, a plurality of event net groups 1033 respectively connected to the feature vector storing section 1031, each event net group 1033 having a plurality of event nets 1032 connected in parallel, an event net output storing section 1036 connected to each event net 1032 and provided for each event net group 1033, a plurality of word nets 1011 respectively connected to the plurality of event net groups 1033, a plurality of word net output storing section 1037 respectively connected to the plurality of word nets 1011, a super net 1018 connected to the plurality of word nets 1011, a result determining section 1034 connected to the super net 1018, and a result output section 1035 connected to the result determining section 1034.

Next, the description will be directed to how the voice recognition apparatus shown in FIG. 24 works.

The voice is input through the microphone 1025 to the amplifier 1026 in which the voice is amplified. The amplified voice signal is converted from an analog signal to a digital one in the A/D converter 1027. Then, the digital signal is sent to the frequency-analyzing section 1029.

In the frequency-analyzing section 1029, the bandpass filters 1028 serve to frequency-analyze the digital signal and output powers at the respective frames.

The frequency-analyzing section 1029 may employ not only the bandpass filters but also parameters obtained by a liner predictive coding system (referred to as an LPC system) or a cepstrum analyzing system.

The compression section 1030 serves to reduce the dimensions of the feature vectors of the input voice with the K-L transformation, for the purpose of reducing the scale of the network.

The feature vector storing section 1031 sequentially receives the feature vectors compressed in the compression section 1030.

Immediately after the apparatus is activated, in actual, no voice is applied from the microphone. Hence, the feature vector storing section 1031 serves to store the feature vectors of a noise or an out of vocabulary period for T seconds in a pseudo manner (A value of T depends on the number of the recognition vocabulary).

Since this voice recognition apparatus does not detect a front endpoint, all the frame signals output by the feature vector storing section 1031 are sent to the event net 1032. As shown, a plurality of event nets 1032 connected in parallel compose the event net group 1033.

The feature vector storing section 1031 consists of a ring buffer as shown in FIG. 24. The current feature vector is stored at the storing position indicated by a W pointer (writing). An F pointer indicates an assumed time (frame) of a front endpoint. In actual, since each word has the corresponding time length, the value of T should be defined on each word (where $r=1, 2, \ldots, R$, with R denotes the number of vocabulary) for more efficient processing. The word r is a reference pattern arranged in the event net and the word net.

Assuming that the current time is $t_b$, the W pointer is $t_b$ and the head of the word r is $t_f^r$.

The value of T should be set as about the largest time of the word included in the vocabulary. Herein, it is set as 1.2 seconds.

When the current time is $t_b$, the front endpoint assumed for the word r is assumed to match to all the frames in the period $[t_f^r, t_f^r + \Delta]$, where $\Delta = t_b - t_f^r - T_{min}^r$ and $T_{min}^r$ denotes the smallest possible time length of the word r.

Figure 26:
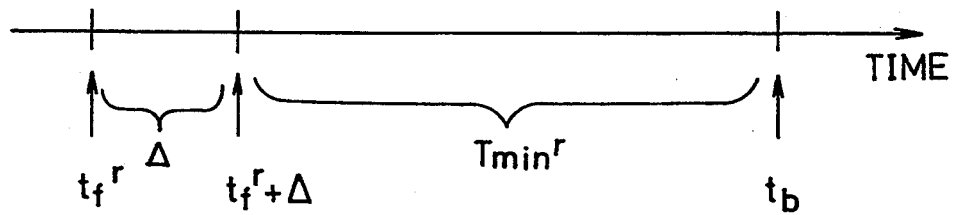
FIG. 26 is a chart showing relation between a current time and an assumed front endpoint.

FIG. 26 shows relation among the current time $t_b$, the front endpoint $t_f^r$ of the word r, the smallest possible time $T_{min}^r$, and $\Delta$.

Next, the description will be directed to how this voice recognition apparatus detects the front endpoint.

At first all the frames in the period $[t_f^r, t_f^r + \Delta]$, that is, $t_f^r, t_f^r + 1, t_f^r + 2, \ldots, t_f^r + \Delta$ are assumed as a front endpoint.

If $t_f^r$ matches to the front endpoint, the searching area of the event net $E_{r1}$ matched to the head of the word r is set to range from $-K$ and $+K$ frames based on the event net $E_{r1}$. In this case, the frames to be recognized by the event net $E_{r1}$ stay within the range of $t_f^r - 3, t_f^r - 2, \ldots, t_f^r + 3$.

If $t_f^r + 1$ matches to the front endpoint, the frames to be recognized by the event net $E_{r1}$ stay within the range of $t_f^r - 2, t_f^r - 1, \ldots, t_f^r + 4$. Of these frames, $t_f^r - 2, t_f^r - 1, \ldots, t_f^r + 3$ have been already computed and stored in the event net output storing section 1036 when $t_f^r$ is assumed as the front endpoint. Hence, the computing results can be used in this case.

Like the feature vector storing section 1031, the event net output storing section 1036 employs a ring buffer structure. As shown in FIG. 24, the event net output storing section 1036 is provided in each event net group 1033 matching to the word r. That is, N event net output storing sections 1030 are prepared for one word r (N means the number of the event net groups 29. Herein, $N=5$).

If $t_f^r + 1$ matches to the front endpoint, in actual, the event net $E_{r1}$ is required to process a frame of $t_f^r + 4$ only.

Like the event net $E_{r1}$, the remaining event nets $E_{r2}$, $E_{r3}$, $E_{r4}$ and $E_{r5}$, each uses the overlapped computing portions read from each event net output storing section 1036. And, the newly computed results are written in each event net output storing section 1036.

When the front endpoint is assumed as $t_f^r$ to $t_f^r + \Delta$, the output of the event net 1032 at the current time $t_b$ is obtained as mentioned above.

Next, the front endpoint defined on the largest value of the event net $E_{r1}$ within the period of $[t_f^r, t_f^r + \Delta]$ is represented as $f_1^r, f_2^r, \ldots, f_p^r$, wherein p has a value meeting the condition of $p < \Delta$, normally, 2 or 3.

The word net output storing section 1037 stores the output of the word net 11 provided when the event net $E_{r1}$ selects the front endpoint $f_j^r$ ($j=1, 2, \ldots, p$).

Then, the largest value stored in the word net output storing section 1037 is selected and output to the super net 1018.

Then, the description will be directed to how the event net 1032, the word net 1011 and the super net 1018 basically function.

Figure 27:
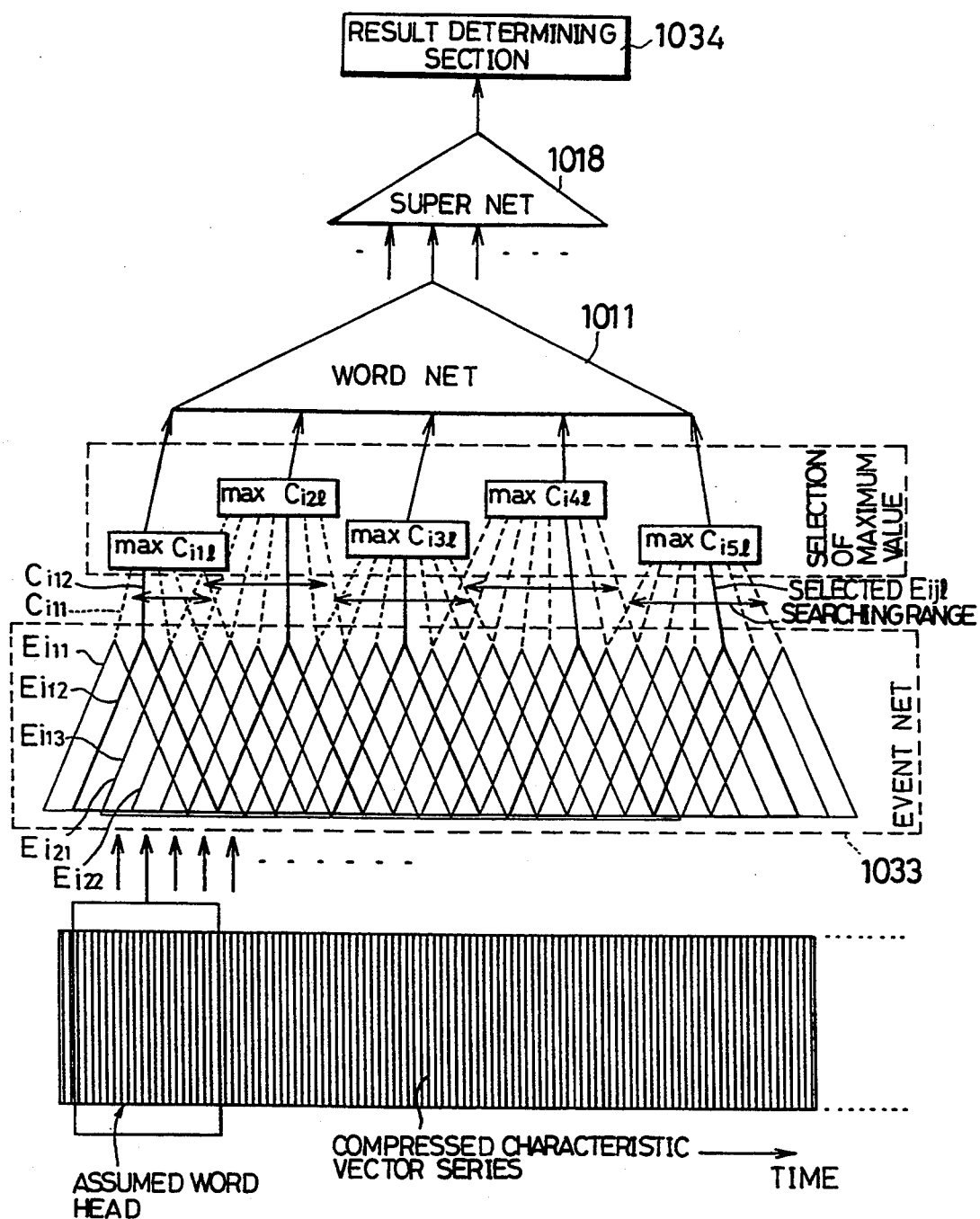
FIG. 27 is a view showing how the neural networks are arranged in the fourth embodiment.
Figure 28:
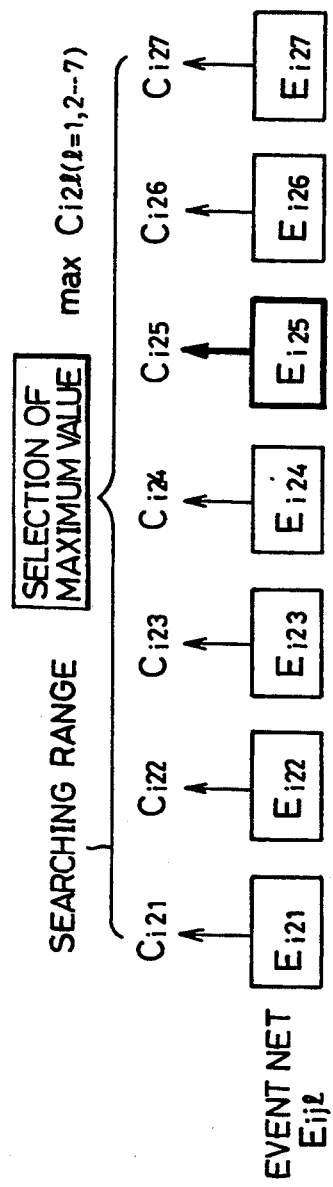
FIG. 28 is a view illustrating selection of a maximum value among the outputs of the event nets.

In FIG. 27, the specific feature vectors to be recognized by each event net 1032 are input to the input layer of the event net 1032.

For inputting a specific word to the input layer, the input frame is shifted N times on time axis so as to prepare N input frames 111 (N is a positive integer). In this embodiment, N is equal to five.

The value of N depends on each word. If the word has four or less syllables, N is preferably set as 5. If the word has five or more syllables, N is preferably set as $N=[m/2+3.5]$ (where m denotes the number of syllables and [x] denotes the largest integer but not larger than x).

Then, the description will be directed to how to ship the feature vector series on time axis when the input utterance is being recognized.

Assuming that $E_{ij}$ denotes the j-th event net for recognizing the i-th word category of the recognition vocabulary, the event net $E_{ij}$ has two units $c_{ij}$, $C_{ij}$ in the output layer.

When the event net $E_{ij}$ receives the partial phoneme series of the word (i-th word) to be recognized by $E_{ij}$ (Assuming that the time length of the word is 1, the partial phoneme series match to the length from the front endpoint to the j/N-th phoneme), the event net $E_{ij}$ is made to learn so that the two units are;

$$(c_{ij}, C_{ij}) = (1, 0) \quad (9)$$

When it receives the other phonemes, the event net $E_{ij}$ is made to learn so that the two units are;

$$(c_{ij}, C_{ij}) = (0, 1) \quad (10)$$

It means that $C_{ij}$ has a high value at a certain time point of the word to be recognized by $E_{ij}$.

The shifting interval of the feature vector series along time axis is denoted as the compressed one-frame feature vector series. To reduce the amount of computation more, it may be denoted as the two-frame feature vector series.

Assuming that the shifting amount (which is equal to the same number of frames in the searching area) is n, the value of n depends on each event net $E_{ij}$. In FIG. 26, the event net $E_{i1}$ has a value of n=5. The event net $E_{i2}$ has a value of n=7.

The event net $E_{ij}$ is indicated as $E_{ij1}, E_{ij2}, \ldots, E_{ijn}$ in sequence from the start. The output of the event net $E_{ij}$ is generally indicated as $C_{ij1}, C_{ij2}, \ldots, C_{ijn}$. In FIG. 26, as an example, $E_{i11}, E_{i12}, E_{i13}, E_{i21}, E_{i22}, C_{i11}$ and $C_{i12}$ are shown. The largest value of $C_{ij1}, C_{ij2}, \ldots, C_{ijn}$ is selected for each i value.

The searching area of the event net $E_{i1}$ is defined to have the constant amount, for example, respective three frames before and after the detected front endpoint or to have a constant number of times as long time as a standard deviation of a word time length according to the statistic based on many and unspecified speakers.

In FIG. 27, the searching area of the event net $E_{ij}$ is indicated by a horizontal arrow bar. The bold real line indicates the location at which the maximum value of $C_{ij1}$ (j=1, 2, ..., 5) is selected. For example, for $E_{i1}$, $E_{i12}$ is selected and for $E_{i12}, E_{i25}$ is selected.

Then, the event net $E_{ij-1}$ indicates the event net one before the event net $E_{ij}$ (j>1). (For example, the event net one before the event net $E_{i4}$ is $E_{i4-1}$, that is, $E_{i3}$. Hereinafter, a symbol of — is effective in only "j").

The searching area of $E_{ij}$ (j>1) can be derived on an average m and a standard deviation $\sigma_j$ of a time difference between $E_{ij}$ and $E_{ij-1}$ (a symbol of — is effective in only "j") predetermined on the statistic. How to derive it will be discussed below. m is constant independently of j.

By selecting the largest value out of the outputs $C_{ij-1}$, $C_{ij-2}, \ldots, C_{ij-n}$, the location of the event net $E_{ij-1}$ is defined.

The searching area of the event net $E_{ij}$ ranges from $m-k\sigma_j$ to $m+k\sigma_j$ based on the location where the output $C_{ij-1}$ is the largest. K is a constant, and could be 2 or 3, for example.

That is, assuming that the searching area is $(L_j, R_j)$, $L_j=\max(m-k\sigma_j$, a location where the output $C_{ij-1}$ is the largest), $$R_j = m + K\sigma_j$$

As an example, when j=2, the output $C_{i25}$ is selected as the largest value from the outputs $C_{i21}, C_{i22}, \ldots, C_{i27}$ (see FIGS. 26 and 27).

When selecting the maximum value, the following transformations may be considered on the quality and computing amount of the event net without being uniquely defined to MAX $(C_{ij1})$.

First, if the values of $C_{ij1}$ (1, 2, ..., n) are all small, the center of the searching range, that is, 1=m can be selected without selecting the maximum value. The selection allows unnecessary matching to be prevented if any word except the one to be recognized by $E_{ij}$ is input. It results in enhancing a "reject" capability.

Second, if the values of $C_{ij1}$ (l=1, 2, ..., n) are all large, like the first transformation, 1=m can be selected. This selection allows unnatural matching to be prevented if the similar feature vectors are kept long, which case may result from long vowels, for example.

Third, if the values of $C_{ij1}$ (l=1, 2, ..., n) are all small, the searching area is made wider by a constant amount $\alpha$ to m=m+$\alpha$. Then the value of $C_{ij1}$ is obtained about 1=m+1, m+2, ..., m+$\alpha$ for selecting the maximum value of the obtained values. This selection is effective especially in a sample voiced slowly.

Then, the description will be directed to the learning methods of the event net 1032, the word net 1011 and the super net 1018.

The event net 1032, the word net 1011 and the super net 1018 respectively consist of a multilayered perceptron type neural network. Those nets are made to learn with the error back propagation method.

The event net 1032, the word net 1011 and the super net 1018 can learn the speech sample and the noise sample or the out of vocabulary sample, that is, noise interval.

When these nets learn the noise sample (noise interval), a teacher signal of;

$$(C_{ij}, C_{ij}) = (0, 1)$$

is given to the event net so that the noise sample is not the partial phoneme series to be recognized by the event net.

If, however, the phoneme series to be recognized by the event is a long voiceless interval such as a double consonant, the teacher signal is not given thereto.

Whether or not the noise sample (the teacher signal) is given is determined by retrieving a sample with a large error and removing the sample out of the later learning process if it is the noise sample.

If the noise sample is input to the word net, a teacher signal of;

$$(C_i, C_i) = (0, 1)$$

is given to the word net so that the noise sample is the word to be recognized by the word net.

When such a word net sends an output to the super net, a value of 1 is given to the unit in charge of "reject" in the learning process of the super net.

The actual voice-recognizing process takes the step of setting $t_b$ as the current time and incrementing $t_b$ one frame by one frame such that $t_b+1, t_b+2, t_b+3, \ldots$. In synchronous to it, the front endpoint $t_f$ is incremented one frame by one frame.

When the front endpoint $t_f$ is all incremented one frame by one frame, the front endpoint $t_f$ has the same value independently of the word r.

By referencing the computed result of the event net $E_{r1}$ at the interval $[t_f, t_f+\Delta]$, stored in the event net output storing section 1036, it is possible to skip the frame at which the event net $E_{r1}$ outputs the low value, for the purpose of more efficient computation.

If the relation $C_{r1} < \theta_1$ is met at $t_f + i$ ($1 \leq i \leq \Delta$), wherein $\theta_1$ is a threshold value (normally, 0.1 to 0.2), $t_f$ is set to be increment by i+1, that is, the next front endpoint assumed frame is $t_f + i + 1$.

In the foregoing method, at the current time $t_b$, there exist a plurality of front endpoint candidates for each word r. Yet, the largest output can be selected as an output of each word net 1011.

The selected output is sent to the super net 1018 which can compute the output at each current time $t_b$. The super net 1018 sends the output to the result determining section 1034 in which the output is determined on the threshold value. The recognized result is sent to the result output section 1035.

How to determine the recognized result in the result determining section 1034 will be discussed below.

Assume that $C_i$ is an output of the output-layer unit for the i-th word included in the super net 1018, n is the number of vocabulary, $C_{n+1}$ is a value of the output-layer unit for "reject" included in the super net 1018, $\theta_a$ and $\theta_d$ are threshold values, herein, $\theta_a$ is 0.6, and $\theta_d$ is 0.1.

Then, the following rules are used for determining the output of the super net 1018.

If max $(C_i) < \theta_a$ $(1 \leq i \leq n)$, the output is rejected (Rule 1)

If max $(C_i)$ $(1 \leq i \leq n) -$ max $(C_i)$ $(1 \leq i \leq n, i \neq I) < \theta_d$ (where I is a value meeting max$(C_i) = C_I$), the output is rejected (Rule 2)

If $C_{n+1} > \theta a$, the output is rejected (Rule 3)

If $C_i$ does not meet with any of these Rules, the recognized result is I meeting the equation of max $(C_i) = C_I$ $(1 \leq i \leq n)$ (Rule 4)

The recognized result is sent to the result output section 35 in which it is displayed.

In addition, the event net 1032, the word net 1011 and the super net 1018 may employ a voiced word for learning except the recognition vocabulary. They learn it with the same learning method as the noise sample.

As a result of increasing the learning sample, the learning needs a longer time. However, it is possible to improve a "reject" capability to any word except the recognition vocabulary and find out a word included in the recognition vocabulary from the continuously word utterances.

The present voice recognition apparatus is thus effective for a comparatively stationary noise. It results in allowing the event net 1032 to learn voice samples having various levels of stationary noises, thereby being able to properly recognize any voice under the various stationary noises with the generalizing capability of the neural network.

TABLE 1

| PATTERN SYMBOL | PHENOMENON |
| --- | --- |
| cl, *cl | CLOSURE INTERVAL OF AFFRICATIVE (*VOICED) AND PAUSE INTERVAL OF DOUBLE CONSONANT |
| p, t, k, b, d, g | INTERVAL EXCEPT CLOSURE OF AFFRICATIVE |
| mm | NASAL CONSONANT INTERVAL |
| s, h, sh, z dj, f | FRICATIVE INTERVAL |
| w, y | SEMIVOWEL INTERVAL |
| r | POST ALVEOLAR INTERVAL |
| a, i, u, e, o | VOWEL INTERVAL |
| j | PALATAL SEMI-VOWEL INTERVAL |
| n | SYLLABIC NASAL INTERVAL |
| ts, ch | INTERVAL EXCEPT CLOSURE OF AFFRICATIVE |

What is claimed is:

1. A voice recognition apparatus capable of recognizing any word utterance by using a neural network, said apparatus comprising:

means for inputting an input utterance and for outputting compressed feature variables of said input utterance, said input means including means for receiving said input utterance, means connected to said receiving means for amplifying said input utterance, means connected to said amplifying means for extracting said feature variables from an electrical signal, and means connected to said extracting means for compressing said feature variables;

a word-head detecting section for detecting a front endpoint of said input utterance from said compressed feature variables, said word-head detecting section outputting said compressed feature variables if said front endpoint is detected as a start end of said input utterance, said word-head detecting section not outputting said compressed feature variables if said front endpoint is not detected;

a first means connected to said input means for receiving said compressed feature variables output from said word-head detecting section and for outputting a value corresponding to a similarity in partial phoneme series of a specific word among vocabularies to be recognized with respect to said input utterance, said first means being capable of sound analyzing said input utterance so that feature values are generated and shifted in a time scale and an input frame is selected so as to maximize each of said output values output from said first means corresponding to a similarity among said shifted feature values, said first means including a plurality of event nets for receiving feature variables extracted from an input utterance, each of said event nets being arranged to shift said feature variables, within a predetermined range from a front endpoint positioned at any time, in accordance with time interval information obtained by analyzing speech samples of a plurality of persons and by selecting a location at which a maximum output is made possible among shifted locations of said feature variables so that a value, corresponding to a similarity between said partial phoneme series of said corresponding word to be recognized and said input utterance, is output;

a second means, connected to said first means, for receiving all of said values output from said first means and for outputting a value corresponding to a similarity in said specific word with respect to said input utterance;

a third means, connected to said second means, for receiving all of said values output from said second means and for outputting a value corresponding to a classification of voice recognition, in which said input utterance belongs, so as to output a value corresponding to a similarity between said input utterance and words to be recognized.

2. A voice recognition apparatus according to claim 1, wherein said first means includes a plurality of event nets for selecting said input frame so that each of said event nets can supply a maximum value as said feature variables are shifted along a time axis.

3. A voice recognition apparatus to claim 2, wherein said second means includes at least one word net, each of said word nets being connected to a corresponding event net and for outputting said value, corresponding to said similarity in said specific word with respect to said input utterance.

4. A voice recognition apparatus according to claim 3, wherein said third means is a super net connected to said word net or said plurality of word nets for receiving all said values output from said word net or said plurality of word nets and for outputting said value corresponding to said classification of voice recognition in which said input utterance belongs.

5. A voice recognition apparatus according to claim 4, wherein each of said first, second and third means includes
an input layer for receiving said values output from said plurality of event nets,
a middle layer connected to each of said event nets respectively for receiving a first signal output from said input layer and for outputting a second signal produced by converting said first signal of said input layer using a sigmoid function, and
an output layer for outputting said value corresponding to said similarity in said specific word with respect to said input utterance.

6. A voice recognition apparatus according to claim 3, wherein a count of said word nets is equal to a count of said vocabularies to be recognized.

7. A voice recognition apparatus according to claim 3, wherein said apparatus further comprises:
a feature variable storing section connected to said compressing means for storing said compressed feature variables,
respective event net output storing sections connected to outputs of said plurality of said event nets for storing output signals of said event nets, and respective word net output storing sections connected to outputs of said word nets for storing output signals of said word nets.

8. A voice recognition apparatus according to claim 1, wherein said apparatus uses a Dynamic Programming method for checking said similarity between said specific word and said input utterance, and a count of said word nets is equal to a count of said vocabularies to be recognized.

9. A voice recognition apparatus according to claim 1, wherein said means for receiving said input utterance is a microphone.

10. A voice recognition apparatus according to claim 1, wherein said means connected to said receiving means for amplifying said input utterance is an amplifier.

11. A voice recognition apparatus according to claim 1, wherein said extracting means includes an analog-to-digital converter for converting said amplified input voice into said electrical signal, with said electrical signal being a digital signal.

12. A voice recognition apparatus according to claim 11, wherein said extracting means further includes a plurality of bandpass filter groups, each of said groups being composed of a plurality of low pass filters, each of said low pass filters enabled to extract said feature variable from said electrical signal.

13. A voice recognition apparatus according to claim 1, wherein said means connected to said extracting means for compressing said feature variables is a compression device.

14. A voice recognition apparatus according to claim 1, wherein said word-head detecting section tests for presence, in an output signal of said compressing means, of a short-period power, said short-period power being defined as present whenever at least a predetermined threshold value is maintained by said output signal for at least a predetermined period of time.

* * * * *